United States Patent
Singh et al.

(10) Patent No.: US 12,026,551 B2
(45) Date of Patent: Jul. 2, 2024

(54) COMMUNICATION AND SYNCHRONIZATION WITH EDGE SYSTEMS

(71) Applicant: Nutanix, Inc., San Jose, CA (US)

(72) Inventors: Naorem Khogendro Singh, San Jose, CA (US); Sandeep Reddy Goli, San Jose, CA (US); Satyam B. Vaghani, San Jose, CA (US); Shyan-Ming Perng, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/185,300

(22) Filed: Mar. 16, 2023

(65) Prior Publication Data

US 2023/0289225 A1 Sep. 14, 2023

Related U.S. Application Data

(62) Division of application No. 16/666,242, filed on Oct. 28, 2019, now Pat. No. 11,635,990.

(Continued)

(51) Int. Cl.
*G06F 9/54* (2006.01)
*G06F 9/38* (2018.01)
(Continued)

(52) U.S. Cl.
CPC .......... *G06F 9/5011* (2013.01); *G06F 9/3869* (2013.01); *G06F 9/5077* (2013.01); *G06F 9/542* (2013.01); *H04L 67/125* (2013.01)

(58) Field of Classification Search
CPC . G06F 9/54; G06F 9/542; G06F 9/544; G06F 9/546; H04L 29/06
See application file for complete search history.

(56) References Cited

U.S. PATENT DOCUMENTS 6,550,057 B1 4/2003 Bowman-Amuah
7,237,360 B2 7/2007 Moncho et al.
(Continued)

FOREIGN PATENT DOCUMENTS

CN 101916200 A 8/2015
CN 110795442 B 4/2022
(Continued)

OTHER PUBLICATIONS

U.S. Appl. No. 18/321,678 titled "Generic Proxy Endpoints Using Protocol Tunnels Including Life Cyclemanagement and Examples for Distributed Cloud Native Services andapplications" filed May 22, 2023.
(Continued)

*Primary Examiner* — Andy Ho
(74) *Attorney, Agent, or Firm* — Stoel Rives LLP

(57) ABSTRACT

A scalable Internet of Things (IoT) system may include multiple instances of an IoT manager, each instance respectively configured to connect to a respective edge system of multiple edge systems. The IoT system may further include a containerized system configured to allow any instance of the IoT manager to deploy data pipelines to any edge system of the multiple edge systems in delta communications. Any instance of the IoT manager may send a change message to any edge system via a publish/subscribe notification method. In some examples, a centralized IoT manager may form a secure communication with an edge system, synchronize an object model with an edge object model for the edge system, and maintain the edge system using delta change communications. The IoT system may facilitate any instance of the IoT manager to subscribe a communication channel with an associated edge system for receiving update notification.

32 Claims, 10 Drawing Sheets

Related U.S. Application Data

(60) Provisional application No. 62/869,348, filed on Jul. 1, 2019.

(51) Int. Cl.
  *G06F 9/50* (2006.01)
  *H04L 67/125* (2022.01)

(56) References Cited

U.S. PATENT DOCUMENTS

| | | |
|---|---|---|
| 7,310,664 B1 | 12/2007 | Merchant et al. |
| 8,543,665 B2 | 9/2013 | Ansari et al. |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,210,534 B1 | 12/2015 | Matthieu et al. |
| 9,244,951 B2 | 1/2016 | Mandelstein et al. |
| 9,253,252 B2 | 2/2016 | Agarwal et al. |
| 9,336,132 B1 | 5/2016 | Aron et al. |
| 9,600,494 B2 | 3/2017 | Maluf et al. |
| 9,606,794 B1 | 3/2017 | Chou et al. |
| 9,633,197 B2 | 4/2017 | Lakshmanan et al. |
| 9,634,893 B2 | 4/2017 | Boutros et al. |
| 9,641,650 B2 | 5/2017 | Virkki et al. |
| 9,652,265 B1 | 5/2017 | Narayanasamy et al. |
| 9,684,502 B2 | 6/2017 | Fu et al. |
| 9,729,411 B2 | 8/2017 | Purusothaman |
| 9,736,194 B1 | 8/2017 | Rao et al. |
| 9,747,287 B1 | 8/2017 | Bhardwaj et al. |
| 9,769,032 B1 | 9/2017 | Ghodsi et al. |
| 9,772,866 B1 | 9/2017 | Aron et al. |
| 9,836,296 B2 | 12/2017 | Vandikas et al. |
| 9,860,677 B1 | 1/2018 | Agerstam et al. |
| 9,917,865 B2 | 3/2018 | Arora et al. |
| 9,977,415 B2 | 5/2018 | Zimmerman et al. |
| 10,091,270 B2 | 10/2018 | Fang |
| 10,149,154 B2 | 12/2018 | Zimmerman et al. |
| 10,156,842 B2 | 12/2018 | Wu et al. |
| 10,181,978 B1 | 1/2019 | Argenti |
| 10,225,335 B2 | 3/2019 | Fu et al. |
| 10,230,798 B2 | 3/2019 | Doraiswamy et al. |
| 10,262,019 B1 | 4/2019 | Reiner et al. |
| 10,291,714 B2 | 5/2019 | Mathews et al. |
| 10,306,513 B2 | 5/2019 | Bartfai-Walcott et al. |
| 10,489,138 B1 | 11/2019 | Wu et al. |
| 10,515,119 B2 | 12/2019 | Kirk et al. |
| 10,534,629 B1 | 1/2020 | St. Pierre et al. |
| 10,567,925 B2 | 2/2020 | Ly et al. |
| 10,652,226 B2 | 5/2020 | Islam et al. |
| 10,769,113 B2 * | 9/2020 | Jones .................. G06F 16/1844 |
| 10,838,833 B1 | 11/2020 | Jibaja et al. |
| 10,893,116 B1 | 1/2021 | Koehler |
| 10,924,342 B2 | 2/2021 | Joshi et al. |
| 11,178,213 B2 | 11/2021 | Desai et al. |
| 11,194,483 B1 | 12/2021 | Dontu et al. |
| 11,301,762 B1 | 4/2022 | Chen et al. |
| 11,316,733 B1 | 4/2022 | Johson et al. |
| 11,379,525 B1 | 7/2022 | Deutsch et al. |
| 11,397,692 B2 * | 7/2022 | Chhabra ............... G06F 21/602 |
| 11,409,756 B1 | 8/2022 | Park et al. |
| 11,422,863 B2 | 8/2022 | Sengupta et al. |
| 11,429,893 B1 | 8/2022 | Tong |
| 11,501,881 B2 | 11/2022 | Patil et al. |
| 11,635,990 B2 | 4/2023 | Singh et al. |
| 11,665,221 B2 | 5/2023 | Joshi et al. |
| 11,726,764 B2 | 8/2023 | Joshi et al. |
| 2002/0143819 A1 | 10/2002 | Han et al. |
| 2004/0177359 A1 | 9/2004 | Bauch et al. |
| 2005/0060328 A1 | 3/2005 | Suhonen et al. |
| 2008/0270515 A1 | 10/2008 | Chen et al. |
| 2009/0204711 A1 | 8/2009 | Binyamin |
| 2009/0260004 A1 | 10/2009 | Datta et al. |
| 2010/0008510 A1 | 1/2010 | Zayas |
| 2010/0077473 A1 | 3/2010 | Takeshita et al. |
| 2010/0175061 A1 | 7/2010 | Maeda et al. |
| 2011/0153824 A1 | 6/2011 | Chikando et al. |
| 2011/0231899 A1 | 9/2011 | Pulier et al. |
| 2011/0251992 A1 | 10/2011 | Bethlehem et al. |
| 2011/0265077 A1 | 10/2011 | Collison et al. |
| 2012/0102486 A1 | 4/2012 | Yendluri |
| 2012/0167081 A1 | 6/2012 | Sedayao et al. |
| 2012/0265884 A1 | 10/2012 | Zhang et al. |
| 2012/0266156 A1 | 10/2012 | Spivak et al. |
| 2012/0281708 A1 | 11/2012 | Chauhan et al. |
| 2013/0219479 A1 | 8/2013 | Desoto et al. |
| 2013/0227573 A1 | 8/2013 | Morsi et al. |
| 2013/0304903 A1 | 11/2013 | Mick et al. |
| 2013/0332916 A1 | 12/2013 | Chinn et al. |
| 2014/0074539 A1 | 3/2014 | Doering et al. |
| 2014/0075412 A1 | 3/2014 | Kannan et al. |
| 2014/0075431 A1 | 3/2014 | Kumar et al. |
| 2014/0164486 A1 | 6/2014 | Ravinchandran et al. |
| 2014/0279899 A1 | 9/2014 | Gu et al. |
| 2014/0317261 A1 | 10/2014 | Shatzkamer et al. |
| 2014/0330948 A1 | 11/2014 | Dunn et al. |
| 2014/0372508 A1 | 12/2014 | Fausak et al. |
| 2015/0057817 A1 | 2/2015 | Endrizzi et al. |
| 2015/0067030 A1 | 3/2015 | Smith et al. |
| 2015/0074106 A1 | 3/2015 | Ji |
| 2015/0120893 A1 | 4/2015 | Sapaliga et al. |
| 2015/0261876 A1 | 9/2015 | Trikha et al. |
| 2015/0347542 A1 | 12/2015 | Sullivan et al. |
| 2016/0007138 A1 | 1/2016 | Palanisamy et al. |
| 2016/0092176 A1 | 3/2016 | Straub et al. |
| 2016/0092180 A1 | 3/2016 | Straub |
| 2016/0092348 A1 | 3/2016 | Straub et al. |
| 2016/0094398 A1 | 3/2016 | Choudhary et al. |
| 2016/0098265 A1 | 4/2016 | Mahajan et al. |
| 2016/0112268 A1 | 4/2016 | Chung et al. |
| 2016/0156614 A1 | 6/2016 | Jain et al. |
| 2016/0197830 A1 | 7/2016 | Ulevitch et al. |
| 2016/0202964 A1 | 7/2016 | Butcher et al. |
| 2016/0216959 A1 | 7/2016 | Kurian et al. |
| 2016/0315848 A1 | 10/2016 | Weinstein |
| 2016/0315912 A1 | 10/2016 | Mayya et al. |
| 2016/0323161 A1 | 11/2016 | Cuervo Laffaye et al. |
| 2016/0323361 A1 | 11/2016 | Austel et al. |
| 2016/0337104 A1 | 11/2016 | Kalligudd |
| 2016/0337175 A1 | 11/2016 | Rao |
| 2016/0342906 A1 | 11/2016 | Shaashua et al. |
| 2016/0344745 A1 | 11/2016 | Johnson et al. |
| 2016/0345516 A1 | 12/2016 | Britt et al. |
| 2016/0357525 A1 | 12/2016 | Wee et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0097950 A1 | 4/2017 | Meacham et al. |
| 2017/0099176 A1 | 4/2017 | Jain |
| 2017/0102931 A1 | 4/2017 | Risbood et al. |
| 2017/0123939 A1 | 5/2017 | Maheshwari et al. |
| 2017/0126809 A1 | 5/2017 | Chen et al. |
| 2017/0142068 A1 | 5/2017 | Devarajan et al. |
| 2017/0149931 A1 | 5/2017 | Lochhead et al. |
| 2017/0168813 A1 | 6/2017 | Pogrebinsky et al. |
| 2017/0171607 A1 | 6/2017 | Britt |
| 2017/0177334 A1 | 6/2017 | Chou et al. |
| 2017/0177877 A1 | 6/2017 | Suarez et al. |
| 2017/0180272 A1 | 6/2017 | Bernath |
| 2017/0180346 A1 | 6/2017 | Suarez et al. |
| 2017/0185507 A1 | 6/2017 | Eberlein |
| 2017/0185922 A1 | 6/2017 | Lange et al. |
| 2017/0187807 A1 | 6/2017 | Clernon |
| 2017/0201411 A1 | 7/2017 | Mladin et al. |
| 2017/0201585 A1 | 7/2017 | Doraiswamy et al. |
| 2017/0212718 A1 | 7/2017 | Nelson et al. |
| 2017/0213157 A1 | 7/2017 | Bugay et al. |
| 2017/0244600 A1 | 8/2017 | Hussein et al. |
| 2017/0257432 A1 | 9/2017 | Fu et al. |
| 2017/0289173 A1 | 10/2017 | Resch et al. |
| 2017/0315820 A1 | 11/2017 | Entezari et al. |

(56) References Cited

U.S. PATENT DOCUMENTS

| | | |
|---|---|---|
| 2017/0347264 A1 | 11/2017 | Holland et al. |
| 2018/0007055 A1 | 1/2018 | Infante-Lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1 | 4/2018 | Mahindru et al. |
| 2018/0109395 A1 | 4/2018 | Berdy et al. |
| 2018/0109650 A1 | 4/2018 | Berdy et al. |
| 2018/0109929 A1 | 4/2018 | Ly et al. |
| 2018/0123820 A1 | 5/2018 | Kim |
| 2018/0159745 A1 | 6/2018 | Byers et al. |
| 2018/0167392 A1 | 6/2018 | Zakaria |
| 2018/0212970 A1 | 7/2018 | Chen et al. |
| 2018/0219877 A1 | 8/2018 | Hsu et al. |
| 2018/0234351 A1 | 8/2018 | Amento et al. |
| 2018/0293463 A1 | 10/2018 | Brown |
| 2018/0295194 A1 | 10/2018 | Deraz et al. |
| 2018/0300124 A1 | 10/2018 | Malladi et al. |
| 2018/0302266 A1 | 10/2018 | Makovsky et al. |
| 2018/0307464 A1 | 10/2018 | Bijani et al. |
| 2018/0307537 A1 | 10/2018 | Chen et al. |
| 2018/0309819 A1 | 10/2018 | Thompson |
| 2018/0314808 A1 | 11/2018 | Casey et al. |
| 2018/0324204 A1 | 11/2018 | Mcclory et al. |
| 2018/0332116 A1 | 11/2018 | George et al. |
| 2018/0338242 A1 | 11/2018 | Li et al. |
| 2018/0373419 A1 | 12/2018 | Chen et al. |
| 2018/0373555 A1 | 12/2018 | Gupta et al. |
| 2019/0014048 A1 | 1/2019 | Krishna Singuru |
| 2019/0018951 A1 | 1/2019 | James et al. |
| 2019/0026082 A1 | 1/2019 | Shalev et al. |
| 2019/0034837 A1 | 1/2019 | Lou et al. |
| 2019/0041824 A1 | 2/2019 | Chavez et al. |
| 2019/0045033 A1 | 2/2019 | Agerstam et al. |
| 2019/0068445 A1 | 2/2019 | Chauhan et al. |
| 2019/0087220 A1 | 3/2019 | Turner |
| 2019/0098113 A1 | 3/2019 | Park et al. |
| 2019/0109816 A1 | 4/2019 | Liu et al. |
| 2019/0114211 A1 | 4/2019 | Reddipalli et al. |
| 2019/0121889 A1 | 4/2019 | Gold et al. |
| 2019/0123959 A1 | 4/2019 | Joshi et al. |
| 2019/0141022 A1 | 5/2019 | Reeve et al. |
| 2019/0146773 A1 | 5/2019 | Attard |
| 2019/0158353 A1 | 5/2019 | Johnson et al. |
| 2019/0158600 A1 | 5/2019 | Cook |
| 2019/0182333 A1 | 6/2019 | Bartfai-Walcott et al. |
| 2019/0188742 A1 | 6/2019 | Vasudevan et al. |
| 2019/0190776 A1 | 6/2019 | Bregman et al. |
| 2019/0213273 A1 | 7/2019 | Vasudevan et al. |
| 2019/0243836 A1 | 8/2019 | Nanda et al. |
| 2019/0251166 A1 | 8/2019 | Penrose et al. |
| 2019/0286353 A1 | 9/2019 | Soni et al. |
| 2019/0295012 A1 | 9/2019 | Marinescu et al. |
| 2019/0319919 A1 | 10/2019 | Knecht et al. |
| 2019/0320038 A1 | 10/2019 | Walsh et al. |
| 2019/0342182 A1 | 11/2019 | Dhanabalan et al. |
| 2020/0014607 A1 | 1/2020 | Gangaadhar et al. |
| 2020/0014633 A1 | 1/2020 | You et al. |
| 2020/0034776 A1 | 1/2020 | Peran et al. |
| 2020/0073739 A1 | 3/2020 | Rungta et al. |
| 2020/0092789 A1 | 3/2020 | Lee et al. |
| 2020/0097274 A1 | 3/2020 | Sarkar et al. |
| 2020/0104723 A1 | 4/2020 | Reissner et al. |
| 2020/0112487 A1 | 4/2020 | Inamdar et al. |
| 2020/0122038 A1 | 4/2020 | Ebrahimi et al. |
| 2020/0126129 A1 | 4/2020 | Lkhamsuren |
| 2020/0127832 A1 | 4/2020 | Ebrahimi |
| 2020/0177503 A1 | 6/2020 | Hooda et al. |
| 2020/0177630 A1 | 6/2020 | Penner et al. |
| 2020/0192690 A1 | 6/2020 | Gupta et al. |
| 2020/0218580 A1 | 7/2020 | Kim |
| 2020/0258627 A1 | 8/2020 | Setegn et al. |
| 2020/0274776 A1 | 8/2020 | Nishikawa |
| 2020/0287737 A1 | 9/2020 | Mishra et al. |
| 2020/0336467 A1 | 10/2020 | Subbarayan et al. |
| 2020/0356415 A1 | 11/2020 | Goli |
| 2021/0004270 A1 | 1/2021 | Singh et al. |
| 2021/0005330 A1 | 1/2021 | Patil et al. |
| 2021/0006636 A1 | 1/2021 | Koehler et al. |
| 2021/0042104 A1 | 2/2021 | Tashkandi |
| 2021/0042160 A1 | 2/2021 | Alamouti et al. |
| 2021/0044579 A1 | 2/2021 | Nelson-Gal et al. |
| 2021/0058338 A1 | 2/2021 | Liu |
| 2021/0067607 A1 | 3/2021 | Gardner et al. |
| 2021/0084670 A1 | 3/2021 | Chauhan et al. |
| 2021/0089408 A1 | 3/2021 | Park et al. |
| 2021/0112059 A1 | 4/2021 | Heldman et al. |
| 2021/0112128 A1 | 4/2021 | Joshi et al. |
| 2021/0140815 A1 | 5/2021 | Pretorius et al. |
| 2021/0160338 A1 | 5/2021 | Koehler et al. |
| 2021/0232344 A1 | 7/2021 | Corrie |
| 2021/0255846 A1 | 8/2021 | Mamgain et al. |
| 2021/0311764 A1 | 10/2021 | Rosoff et al. |
| 2021/0342193 A1 | 11/2021 | Anand |
| 2021/0373965 A1 | 12/2021 | Hadas et al. |
| 2021/0400043 A1 | 12/2021 | Su et al. |
| 2022/0083018 A1* | 3/2022 | Majeed ............... G05B 19/056 |
| 2022/0083389 A1 | 3/2022 | Poothia et al. |
| 2022/0121543 A1 | 4/2022 | Poothia et al. |
| 2022/0138070 A1 | 5/2022 | Mokashi et al. |
| 2022/0147336 A1 | 5/2022 | Joshi et al. |
| 2022/0159093 A1 | 5/2022 | Joshi et al. |
| 2022/0279046 A1 | 9/2022 | Perng et al. |
| 2023/0070811 A1 | 3/2023 | Patil et al. |
| 2023/0141808 A1 | 5/2023 | Joshi et al. |

FOREIGN PATENT DOCUMENTS

| | | |
|---|---|---|
| EP | 2831746 A1 | 2/2015 |
| WO | 9945465 A1 | 9/1999 |
| WO | 2014007811 A1 | 1/2014 |
| WO | 2020096639 A1 | 5/2020 |

OTHER PUBLICATIONS

"Architecting for the Cloud: AWS Best Practice", Amazon Web Services https://d1.awsstatic.com/whitepapers/AWS_Cloud_Best_Practices.pdf, Oct. 2018, pp. 1-50.

"Architecting VMware Unified Access Gateway", https://www.youtube.com/watch?v=URSdJ9qCQKo&t=234s, Apr. 17, 2019, pp. 1.

"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, general availability Jun. 4, 2019, pp. 1-2.

"AWS Architecture Monthly—Internet of Things Jun. 2019", AWS | https://d1.awsstatic.com/whitepapers/architecture-monthly/AWS-Architecture-Monthly-June-2019.pdf, Jun. 2019.

"AWS IoT Greengrass", https://web.archive.org/web/20190624094650/https:/aws.amazon.com/greengrass/, Jun. 2019, pp. 1-13.

"AWS IoT vs. Google IoT vs. Azure IoT", Bizety | https://www.bizety.com/2018/08/28/aws-iot-vs-google-iot-vs-azure-iot/, Aug. 28, 2018, pp. 1-7.

"Azure IoT Central intro walkthrough", https://www.youtube.com/watch?v=G32stXSwtyA&ab_channel=MicrosoftDeveloper, Feb. 2018.

"Best Practices for Cloud Management", Service Now https://www.servicenow.com/content/dam/servicenow-assets/public/en-us/doc-type/resource-center/solution-brief/sb-cloud-management.pdf, Jun. 2017, pp. 1-2.

"Citrix XenDesktop 7.1 on Microsoft Hyper-V Server 2012 R2 on Nutanix Virtual Computing Platform", Citrix APAC Solutions, Jun. 25, 2014, pp. 1-94.

"Cloud IoT Core", https://web.archive.org/web/20190129000453/https:/cloud.google.com/iot-core/, https://web.archive.org/web/20190129000453/https:/cloud.google.com/iot-core/, Jan. 2019, pp. 1-10.

(56) References Cited

OTHER PUBLICATIONS

"Cloud IoT Core—Devices, configuration, and state", Google | https://web.archive.org/web/20190330153113/https://cloud.google.com/iot/docs/concepts/devices, Mar. 2019.
"Cloud IoT Core Private Beta", Google | https://web.archive.org/web/20170518022234/https://cloud.google.com/iot-core/, May 2017.
"Cloud, Fog and Edge Computing—What's the Difference?", https://www.winsystems.com/cloud-fog-and-edge-computing-whats-the-difference/, Dec. 4, 2017, pp. 1-10.
"Comprehensive Guide on Upgrading PKS", PKS 1.3 https://kb.vmware.com/sfc/servlet.shepherd/version/download/068f4000009EfWPAAO, Apr. 2019, pp. 1-45.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-us/blog/extended-offline-operation-with-azure-iot-edge/, Sep. 2018.
"Extract, Transform, Load with AWS IoT Greengrass Solution Accelerator", AWS | https://aws.amazon.com/iot/solutions/etl-accelerator/, Oct. 2019, pp. 1-6.
"Google Cloud IoT Core", Google | https://www.slideshare.net/idof/google-cloud-iot-core, Sep. 2018.
"How to Troubleshoot PKS Upgrade Issues", VMware Tanzu Support Hub https://community.pivotal.io/s/article/how-to-troubleshoot-pks-upgrade-issues?language=en_US, Jul. 17, 2019, pp. 1-11.
"Introducing Google Cloud IoT Core: forsecurely connecting and managing IoTdevices at scale", Google Cloud | https://cloud.google.com/blog/products/gcp/introducing-google-cloud-iot-core-for-securely-connecting-and-managing-iot-devices-at-scale, May 2017.
"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.
"IoT Core device-to-device communication", Google |https://cloud.google.com/community/tutorials/iot-device-to-device, Dec. 2017.
"IoT Partner Quickstart", https://services.google.com/fh/files/misc/iot_partner_quickstart1.0.pdf, Nov. 15, 2018, pp. 1-13.
"IoT: Understanding the shift from cloud to edge computing", https://internetofbusiness.com/shift-from-cloud-to-edge-computing/, Aug. 14, 2018, pp. 1-9.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Meeting at the Edge with VMware Internet of Things (IoT)", https://blogs.vmware.com/edge/files/2017/04/Meeting-at-the-Edge.pdf, Apr. 2017, pp. 1-9.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.
"MPRM: an Overview", ProSyst http://documentation.bosch-si.com/iot/PRM/v6.0/welcome/mprm_functional.html, Jun. 13, 2017, pp. 1-3.
"OpenShift Container Platform Architecture", https://docs.openshift.com/container-platform/4.1/architecture/architecture.html retrieved May 27, 2022 relevant to OpenShift Container Platform 4.1, general availability Jun. 4, 2019, pp. 1-11.
"OpenShift Container Platform cluster monitoring, logging, and Telemetry", RedHat https://access.redhat.com/documentation/en-us/openshift_container_platform/4.2/html/container-native_virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27th relevant to OpenShift Container Platform 4.1 general availability Jun. 4, 2019, pp. 1-13.
"Overview: OpenShift Container Platform", https://docs.openshift.com/container-platform/3.9/getting_started/index.html retrieved May 24th relevant to OpenShift Container Platform 3.9 general availability Oct. 2018, pp. 1-2.
"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, pp. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Pivotal Container Service (PKS)", Pivotal Version 1.2 https://resources.docs.pivotal.io/pdfs/pks-1-2.pdf, Sep. 3, 2019, pp. 1-323.
"Pivotal Container Service Overview", Slideshare https://www.slideshare.net/Pivotal/pivotal-container-service-overview, Jul. 16, 2019, pp. 1-78.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.
"Setting up ServiceNow Cloud Management", DxSherpa https://dxsherpa.com/blogs/setting-up-servicenow-cloud-management/, Jul. 19, 2018, pp. 1-10.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"VMware Announces VMware Tanzu Portfolio to Transform the Way Enterprises Build, Run and Manage Software on Kubernetes", VMware News & Stories https://news.vmware.com/releases/vmware-announces-vmware-tanzu-portfolio-to-transform-the-way-enterprises-build-run-and-manage-software-on-kubernetes, Aug. 26, 2019, pp. 1-11.
"VMware Enterprise PKS Architecture Overview", YouTube https://www.youtube.com/watch?v=504FGHukY8Y, Feb. 9, 2018, pp. 1.
"VMware Tanzu Mission Control Demo", YouTube https://www.youtube.com/watch?v=7m9S4HilJlo, Aug. 28, 2019, pp. 1.

(56) References Cited

OTHER PUBLICATIONS

"What is AWS IoT?", AWS | Youtube: https://www.youtube.com/watch?v=WAp6FHbhYCk&ab_channel=AmazonWebServices; Timestamp 4:55/10:08, Jan. 2018.
"What is IoT Edge?", Code Project | https://www.codeproject.com/Articles/1261285/What-is-IoT-Edge, Sep. 2018, pp. 1-9.
Angelas, "Java Heap Space vs. Stack Memory: How Java Applications Allocate Memory", stackify.com, Sep. 5, 2017, pp. 1-3.
Abadi, , "TensorFlow: Large-Scale Machine Learning on Heterogeneous Distributed Systems", Preliminary White Paper, http://download.tensorflow.org/paper/whitepaper2015.pdf, Nov. 9, 2015, pp. 1-19.
Ai, Yuan et al., "Edge computing technologies for Internet of Things: a primer", Digital Communications and Networks 4 | https://doi.org/10.1016/j.dcan.2017.07.001, 2018, pp. 77-86.
Avram, Abel, "AWS Greengrass Runs Lambda Functions on IoT Devices", InfoQ | https://www.infoq.com/news/2017/06/aws-greengrass/, Jun. 8, 2017, pp. 1-2.
Banka, Roank, "Pivotal CloudFoundry on Google cloud platform", Slideshare https://www.slideshare.net/RonakBanka/pcfgcpgoogleioextended, Jul. 16, 2018, pp. 1-44.
Beguelin, , "Turn Your Smartphone Into an IoT Device", "IBM Developer https://developer.ibm.com/tutorials/iot-mobile-phone-iot-device-bluemix-apps-trs/", Nov. 10, 2015, pp. 1-12.
Beltre, Angel et al., "Enabling HPC workloads on Cloud Infrastructure using Kubernetes Container Orchestration Mechanisms", 2019 IEEE/ACM Workshop on Containers and New Orchestration Paradigms for Isolated Environments in HPC (CANOPIEHPC), 2019, pp. 11-20.
Ben-David, Jacob, "Google Cloud's Anthos—Everything You Need to Know", Turbonomic Blog https://blog.turbonomic.com/google-clouds-anthos, Apr. 15, 2019, pp. 1-9.
Benson, Mark, "Technical Introduction to VMware Unified Access Gateway for Horizon Secure Remote Access", VMWare | https://blogs.vmware.com/euc/2015/09/what-is-vmware-unified-access-gateway-secure-remote-access.html, Sep. 9, 2015, pp. 8.
Cano, Ignacio et al., "Curator: Self-Managing Storage for Enterprise Clusters", University of Washington, Mar. 2017, pp. all.
Chi, Chrissie, "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.
Goldsborough, , "A Tour of TensorFlow: Proseminar Data Mining", Technische Universität München, https://arxiv.org/pdf/1610.01178.pdf, Oct. 2016, pp. 1-16.
Goodison, Donna, "Google Cloud Unleashes Managed Service Mesh, Serverless for Anthos", The Channel Co. CRN https://www.crn.com/news/cloud/google-cloud-unleashes-managed-service-mesh-serverless-for-anthos, Sep. 16, 2019, pp. 1-6.
Grammatikou, , "GEMBus as a Service Oriented Platform for Cloud-Based Composable Services", 2011 IEEE Third International Conference on Cloud Computing Technology and Science, Nov. 1, 2011, pp. 666-671.
Harnik, Danny et al., "Secure Access Mechanism for Cloud Storage", vol. 12, No. 3, pp. 317-336. [Retrieved from internet on Feb. 14, 2023], <https://scpe.org/index.php/scpe/article/view/727>, 2011, pp. 317-336.
Hermann, , "Meet Michelangelo: Uber's Machine Learning Platform", Uber Engineering, https://eng.uber.com/michelangelo-machine-learning-platform/, Sep. 5, 2017, pp. 1-17.
Hoare, , "A Semantic-Agent Framework for PaaS Interoperability", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.
Holzle, Urs et al., "Introducing Anthos: an entirely new platform for managing applications in today's multi-cloud world", Google Cloud Blog https://cloud.google.com/blog/topics/hybrid-cloud/new-platform-for-managing-applications-in-todays-multi-cloud-world, Apr. 9, 2019, pp. 1-6.
Holzle, Urs et al., "Introducing Anthos: an entirely new platform for managing applications in today's multi-cloud world", Google Cloud https://cloud.google.com/blog/topics/hybrid-cloud/new-platform-for-managing-applications-in-todays-multi-cloud-world, Apr. 9, 2019, pp. 1-7.
Islam, Tariq et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
Iyengar, Ashok, "Architecting at the Edge", https://www.ibm.com/cloud/blog/architecting-at-the-edge, Oct. 21, 2019, pp. 1-14.
Iyengar, Ashok et al., "Architectural Decisions at the Edge", https://www.ibm.com/cloud/blog/architectural-decisions-at-the-edge, Jul. 26, 2019, pp. 1-16.
Iyengar, Ashok et al., "Automation at the Edge", https://www.ibm.com/cloud/blog/automation-at-the-edge, Feb. 18, 2017, pp. 1-13.
Iyengar, Ashok, "Cloud at the Edge", https://www.ibm.com/cloud/blog/cloud-at-the-edge, Feb. 26, 2019, pp. 1-9.
Iyengar, Ashok, "DevOps at the Edge", https://www.ibm.com/cloud/blog/devops-at-the-edge, Dec. 3, 2015, pp. 1-13.
Iyengar, Ashok, "GitOps at the Edge", https://www.IBM.com/cloud/blog/gitops-at-the-edge, Nov. 2, 2017, pp. 1-13.
Iyengar, Ashok et al., "Rounding Out the Edges", https://www.ibm.com/cloud/blog/rounding-out-the-edges, May 7, 2019, pp. 1-11.
Jain, , "Dynamic Space-Time Scheduling for GPU Inference", Massachusetts Institute of Technology, University of California, Berkeley; http://learningsys.org/nips18/assets/papers/102CameraReadySubmissionGPU_Virtualization%20(8).pdf, Dec. 31, 2018, pp. 1-8.
Khaddar, , "Smartphone: the Ultimate IoT and IoE Device", IntechOpen, "Smartphones from an Applied Research Perspective", http://dx.doi.org/10.5772/intechopen.69734, Nov. 2, 2017, pp. 137-162 (Ch. 7).
Lacoste, , "User-Centric Security And Dependability in the Clouds-of-Clouds", IEEE Cloud Computing, Sep. 2016, 64-75.
Lewis, Sarah, "Cloudify", TechTarget https://www.techtarget.com/searchcloudcomputing/definition/Cloudify, United Lex Competitive Analysis Report, Jun. 2019, pp. 1.
Li, , "Scaling Machine Learning as a Service", Uber Technologies, Inc., JMLR: Workshop and Conference Proceeding, http://proceedings.mlr.press/v67/li17a/li17a.pdf, Jun. 19-24, 2016, pp. 16-29.
Lin, Jennifer et al., "Anthos simplifies application modernization with managed service mesh and serverless for your hybrid cloud", Google Cloud https://cloud.google.com/blog/topics/hybrid-cloud/anthos-simplifies-application-modernization-with-managed-service-mesh-and-serverless-for-your-hybrid-cloud, Sep. 16, 2019, pp. 1-6.
Lobo, Savia, "Microsoft Azure IoT Edge is open source and generally available!", PacktHub | https://hub.packtpub.com/microsoft-azure-iot-edge-is-open-source-and-generally-available/, Jun. 29, 2018, pp. 1-2.
Mahajan, , "Themis: Fair and Efficient GPU Cluster Scheduling", Cornell University, ARXIV: 1907.01484 [CS.DC], Oct. 29, 2019, 15 pages.
Malasi, Aman, "Google Anthos: Write Once, Run Anywhere", HCL Tech Blogs https://www.hcltech.com/blogs/google-anthos-write-once-run-anywhere, Aug. 26, 2019, pp. 1-2.
Marko, Kurt, "SAP to the fore as Cloud Foundry grows into the preferred platform for cloud-native enterprise apps", Diginomica https://diginomica.com/cloud-foundry-growing-preferred-platform-cloud-native-enterprise-applications, Jun. 19, 2017, pp. 1-10.
McConville, Anton et al., "A brief history of Kubernetes, OpenShift, and IBM", IBM Developer Blog | https://developer.ibm.com/blogs/a-brief-history-of-red-hat-openshift/, Aug. 1, 2019, pp. 9.
McLuckie, Craig, "Introducing VMware Tanzu Mission Control to Bring Order to Cluster Chaos", VMware Tanzu https://tanzu.vmware.com/content/blog/introducing-vmware-tanzu-mission-control-to-bring-order-to-cluster-chaos, Aug. 26, 2019, pp. 1-6.
Mijumbi, et al., "Learning Algorithms for Dynamic Resource Allocation in Virtualised Networks", Proceedings of Workshop on Management of Large Scale Virtualized Infrastructures: Smart Data Acquisition, Analysis and Network and Service Management in the Future Internet, 2014, 4 pages.

(56) References Cited

OTHER PUBLICATIONS

Mohamed, Riaz , "Deploy Cloud Agnostic Applications with VMware vRealize Automation Cloud", VMWare Cloud Management https://blogs.vmware.com/management/2019/09/cloud-agnostic-apps-vra-cloud.html, Sep. 17, 2019, pp. 1-10.

Morabito, Roberto et al., "A Framework Based on SDN and Containers for Dynamic Service Chains on IoT Gateways", Proceedings of the Workshop on Hot Topics in Container Networking and Networked Systems. Ericsson Research, NomadicLab, https://dl.acm.org/doi/pdf/10.1145/3094405.3094413, Aug. 11, 2017, pp. 42-47.

Msv, Janakiram , "5 Reasons Why Azure IoT Edge Is Industry's Most Promising Edge Computing Platform", Forbes | https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.

Msv, Janakiram , "Azure IoT Edge: a Technology Primer", TheNewStack | https://thenewstack.io/azure-iot-edge-a-technology-primer/, Sep. 14, 2018, pp. 1-9.

Msv, Janakiram , "Google Forays Into Edge Computing With Cloud IoT Edge and TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.

Msv, Janakiram , "Why Azure Arc Is a Game Changer for Microsoft", Forbes https://www.forbes.com/sites/janakirammsv/2019/11/05/why-azure-arc-is-a-game-changer-for-microsoft/?sh=373f5c854307, Nov. 5, 2019, pp. 1-10.

O'Keefe, Megan , "Edge Computing and the Cloud-Native Ecosystem", TheNewStack | https://thenewstack.io/edge-computing-and-the-cloud-native-ecosystem/, Apr. 18, 2018, pp. 1-11.

O'Keefe, Megan , "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.

Oleniczak, Kevin , "Using AWS IoT for Predictive Maintenance", AWS | https://aws.amazon.com/blogs/iot/using-aws-iot-for-predictive-maintenance/, Jun. 28, 2018, pp. 1-6.

Paladi, Nicolae et al., "Domain Based Storage Protection with Secure Access Control for the Cloud", https://dl.acm.org/doi/pdf/10.1145/2600075.2600082, 2014, pp. 35-42.

Param, Sunil , "Google's Coral: a new product development platform with local AI", TechGig | https://content.techgig.com/technology/googles-coral-a-new-product-development-platform-with-local-ai/articleshow/69042955.cms, Apr. 26, 2019, pp. 1-18.

Poitras, Steven , "The Nutanix Bible", http://stevenpoitras.com/the-nutanix-bible/ (Publication date based on indicated capture date by Archive.org; first publication date unknown), Jan. 11, 2014, pp. all.

Poitras, Steven , "The Nutanix Bible", https://nutanixbible.com/, Jan. 12, 2016, pp. all.

Poitras, Steven , "The Nutanix Bible", https://nutanixbible.com/, Jan. 3, 2017, pp. all.

Poitras, Steven , "The Nutanix Bible", https://nutanixbible.com/, Jan. 3, 2018, pp. all.

Poitras, Steven , "The Nutanix Bible", http://stevenpoitras.com/the-nutanix-bible/ (Publication date based on indicated capture date by Archive.org; first publication date unknown), Jan. 7, 2015, pp. all.

Poitras, Steven , "The Nutanix Bible", https://nutanixbible.com/, Jan. 8, 2019, pp. all.

Poitras, Steven , "The Nutanix Bible", https://nutanixbible.com/, Jul. 25, 2019, pp. all.

Poitras, Steven , "The Nutanix Bible", http://stevenpoitras.com/the-nutanix-bible/ (Publication date based on indicated capture date by Archive.org; first publication date unknown), Jun. 20, 2014, pp. all.

Poitras, Steven , "The Nutanix Bible", https://nutanixbible.com/, Jun. 25, 2018, pp. all.

Poitras, Steven , "The Nutanix Bible", https://nutanixbible.com/, Jun. 8, 2017, pp. all.

Poitras, Steven , "The Nutanix Bible", http://stevenpoitras.com/the-nutanix-bible/ (Publication date based on indicated capture date by Archive.org; first publication date unknown), Jun. 9, 2015, pp. all.

Poitras, Steven , "The Nutanix Bible", https://nutanixbible.com/, Jun. 9, 2016, pp. all.

Poitras, Steven , "The Nutanix Bible", http://stevenpoitras.com/the-nutanix-bible/ (Publication date based on indicated capture date by Archive.org; first publication date unknown), Oct. 15, 2013, pp. all.

Poitras, Steven , "The Nutanix Bible", https://nutanixbible.com/, Sep. 17, 2019, pp. all.

Poitras, Steven , "The Nutanix Bible", https://nutanixbible.com/, Sep. 4, 2015, pp. all.

Rafique, , "Towards Portability and Interoperability Support in Middleware for Hybrid Clouds", 2014 IEEE INFOCOM Workshop on Cross-Cloud Systems, Apr. 27, 2014, pp. 7-12.

Reid, Nate , "Upgrading VMware Enterprise PKS 1.2 to 1.3", YouTube https://www.youtube.com/watch?v=7pAxNWIxVLM, Jan. 28, 2019, pp. 1.

Ren, Ju et al., "Edge Computing for the Internet of Things", IEEE Journals & Magazine | vol. 32 Issue: 1, 2008, pp. 1-6.

Rhee, Injong , "Bringing intelligence to the edge with Cloud IoT", Google Cloud | https://cloud.google.com/blog/products/gcp/bringing-intelligence-edge-cloud-iot, Jul. 25, 2018, pp. 1-7.

Rosoff, Jared , "Project Pacific—Technical Overview", VMWare | https://blogs.vmware.com/vsphere/2019/08/project-pacific-technical-overview.html, Aug. 26, 2019, pp. 7.

Schonbaum, Iftach , "Anthos—Google's Enterprise Hybrid & Multi-Cloud Platform", CloudZone https://medium.com/cloudzone/anthos-googles-enterprise-hybrid-multi-cloud-platform-7975e05a7729, Apr. 23, 2019, pp. 1-7.

Stakun, Jaroslaw , "Introduction to Red Hat OpenShift Container Platform", Open Virtualization Pro https://www.openvirtualization.pro/red-hat-openshift-container-platform/, Apr. 26, 2019, pp. 1.

Stoks, , "Workspace IoT Series: How Industry 4.0 Will Transform Your Mobile Strategy", "VMware End-User Computing Blog https://blogs.vmware.com/euc/2019/02/workspace-iot-mobile-strategy.html", Feb. 20, 2019, pp. 1-5.

Sun, , "Towards Distributed Machine Learning in Shared Clusters: a Dynamically-Partitioned Approach", Cornell University: ARXIV: 1704.06738V1 [CS.CD], Apr. 22, 2017, 6 pages.

Tamura, Yoshi , "GPUs as a service with Kubernetes Engine are now generally available", Google Cloud | https://cloud.google.com/blog/products/gcp/gpus-service-kubernetes-engine-are-now-generally-available, Jun. 19, 2018, pp. 5.

Vanderzyden, John , "Using AWS Greengrass to Enable IoT Edge Computing", mabl | https://www.mabl.com/blog/using-aws-greengrass-enable-iot-edge-computing, Aug. 23, 2017, pp. 1-12.

Warburton, , "An Intro to GPU Architecture and Programming Models I Tim Warburton, Virginia Tech", YouTube, Argonne National Laboratory Training, https://www.youtube.com/watch?v=IGmPy8xpT4E, Sep. 25, 2017, pp. 1-3.

Warke, Amit et al., "Storage Service Orchestration with Container Elasticity", 2018 IEEE 4th International Conference on Collaboration and Internet Computing DOI 10.1109/CIC.2018.00046, 2018, pp. 283-292.

Wiggers, Kyle , "Microsoft launches Azure IoT Edge out of preview", VentureBeat | https://venturebeat.com/mobile/microsoft-launches-azure-iot-edge-out-of-preview/, Jun. 27, 2018, pp. 1-6.

Wiggers, Steef-Jan , "Google Cloud Platform Release Edge TPU and Cloud IoT Edge", InfoQ https://www.infoq.com/news/2018/07/google-iot-edge-tpu-ai/, Jul. 30, 2018, pp. 1-4.

Wiggers, Steef-Jan , "Google Kubernetes Engine 1.10 Is Generally Available and Enterprise Ready", InfoQ | https://www.infoq.com/news/2018/06/google-kubernetes-engine-1.10-ga, Jun. 1, 2018, pp. 4.

Yamashita, Teppei , "Real-time data processing with IoT Core", Google Cloud | https://cloud.google.com/community/tutorials/cloud-iot-rtdp, Apr. 2018, pp. 1-19.

Zhang, Xinyi , "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.

(56) References Cited

OTHER PUBLICATIONS

Zhao, Zhuoran et al., "DeepThings: Distributed Adaptive Deep Learning Inference on Resource-Constrained IoT Edge Clusters", IEEE Transactions on Computer-Aided Design of Integrated Circuits and Systems, vol. 37, No. 11 | doi: 10.1109/TCAD.2018.2858384., Nov. 2018, pp. 2348-2359.
"Backup & Secure", USGS, 2018.
"Cascade Mode Deployment", https://docs.vmware.com/en/Unified-Access-Gateway/3.10/com.vmware.uag-310-deploy-config.doc/GUID-AWT-DEPLOYMENT-CASCADE.html#GUID-AWT-DEPLOYMENT-CASCADE, Jul. 2, 2019, pp. 2.
"Mobile Content Management—Datasheet", https://www.vmware.com/content/dam/digitalmarketing/vmware/en/pdf/workspace-one/vmware-airwatch-mcm-datasheet.pdf, Mar. 12, 2019, pp. 4.
"Runtime System", Wikipedia, 2018.
"VMware Identity Manager API", https://developer.vmware.com/apis/57/#api, Aug. 2018, pp. 2.
"VMware Tunnel (Per-App VPN) Connections in Cascade Mode", https://docs.vmware.com/en/Unified-Access-Gateway/3.10/com.vmware.uag-310-deploy-config.doc/GUID-B69DD1E7-ED88-4574-912C-DBA071BC9D6F.html, May 31, 2019, pp. 2.
"VMware Unified Access Gateway: Use Cases—Feature Walkthrough", https://www.youtube.com/watch?v=xaN9mYOJqAs, Oct. 27, 2017, pp. 1.
"Workspace ONE UEM 1810 introduces support for Android Enterprise fully managed devices with work profiles", https://bayton.org/blog/2018/10/workspace-one-uem-1810-introduces-support-for-android-enterprise-fully-managed-devices-with-work-profiles/, Oct. 29, 2018, pp. 11.
Bayton, Jason, "Android Enterprise COPE enrolment comparison: WS1 UEM / MI Core", https://www.youtube.com/watch?v=QSJu3xFzjMw, Oct. 28, 2018, pp. 1.
Poitras, Steven, "The Nutanix Bible", https://nutanixbible.com/, Apr. 9, 2019, pp. all.

* cited by examiner

COMMUNICATION AND SYNCHRONIZATION WITH EDGE SYSTEMS

CROSS REFERENCE TO RELATED APPLICATION(S)

This application is a divisional of U.S. application Ser. No. 16/666,242 filed Oct. 28, 2019, issued as U.S. Pat. No. 11,635,990 on Apr. 25, 2023, which claims priority to provisional application No. 62/869,348, filed Jul. 1, 2019, which are incorporated herein by reference, in their entirety, for any purpose.

BACKGROUND

Internet of Things (IoT) systems are increasing in popularity. Generally, IoT systems utilize a number of edge devices. Edge devices may generally refer to computing systems deployed about an environment (which may be a wide geographic area in some examples). The edge devices may include computers, servers, clusters, sensors, appliances, vehicles, communication devices, etc. Edge devices may obtain data (including sensor data, voice data, image data, and/or video data, etc.). While edge devices may provide some processing of the data at the edge device, in some examples edge devices may be connected to a centralized analytics system (e.g., in a cloud or other hosted environment). The centralized analytics system, which may itself be implemented by one or more computing systems, may further process data received from edge devices by processing data received by individual edge devices and/or by processing combinations of data received from multiple edge devices.

Within an IoT computing environment, real-time data analytics computations at edge systems of an IoT system can be complex due to the distributed nature of edge system computing and diversity in methods and protocols for ingesting, processing, and communicating information back to a data cloud. That is, edge systems may be deployed over a wide geographic area, and diversity among the edge systems may make deployment of applications to retrieve and consume edge data across multiple edge systems of the IoT system difficult.

As the number of and complexity of edge systems advantageously increases, a workload of a control plane to manage the IoT system may also increase to a point where compute resources available to the control plane are insufficient to effectively manage the IoT system. When the compute resources become insufficient, the reliability of the IoT system may be adversely affected.

DETAILED DESCRIPTION

Figure 1:
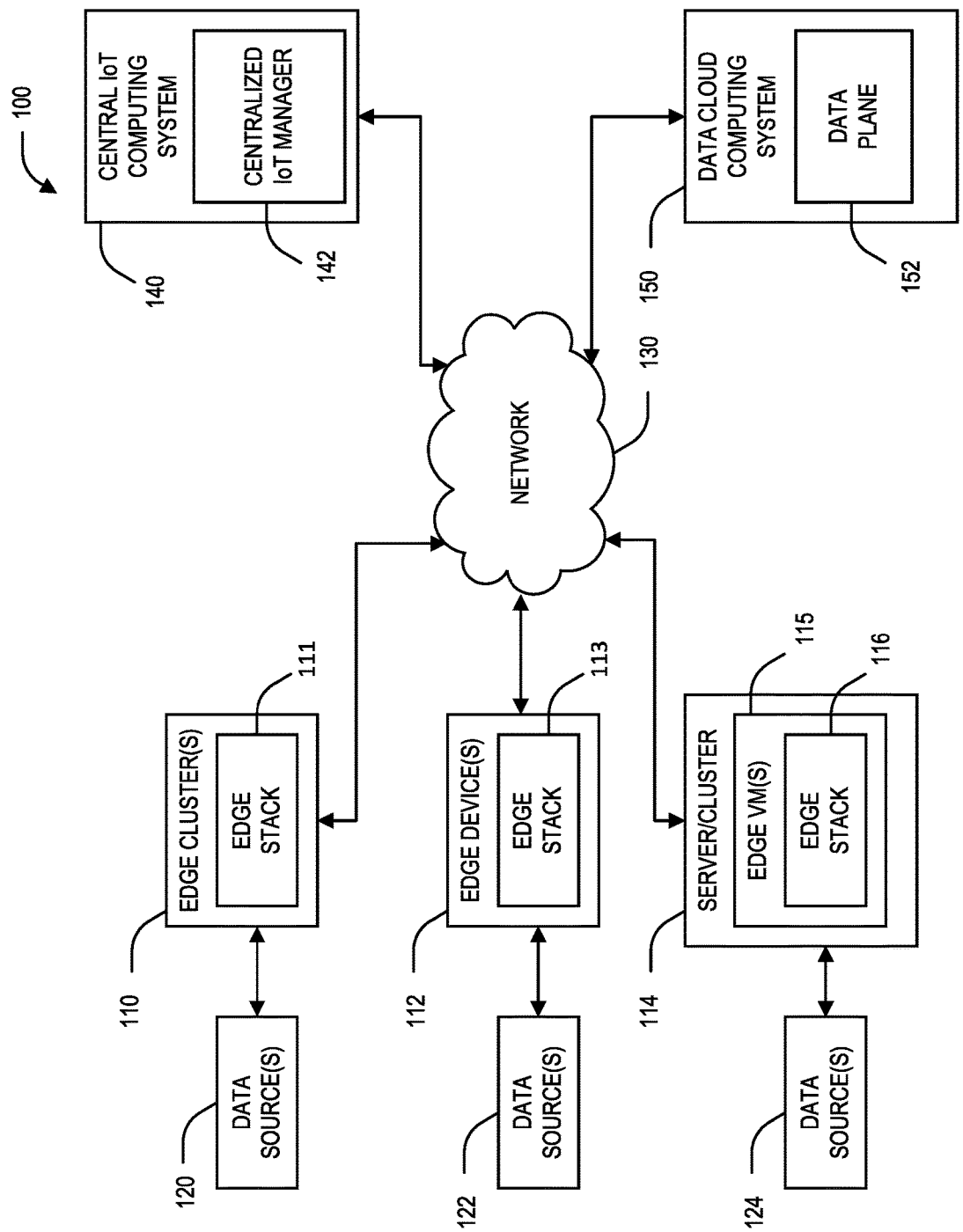
FIG. 1 is a block diagram of an Internet of Things system, in accordance with an embodiment of the present disclosure.

Examples described herein include a scalable centralized Internet of Things (IoT) manager of an IoT system capable of expanding as a number of tenants and edge systems within an IoT system increases. The centralized IoT manager may be implemented using a software as a service (SaaS) architecture, in some examples. In some examples, the centralized IoT manager may support two-way communication using secure protocols, such as hyper-text transfer protocol secure (HTTPS), WebSocket secure (WSS), etc. A metadata object model may be provided to fully specify behavior of edge systems. The centralized IoT manager may manage an initial synchronization of the object model of the edge system, which may then persist at the edge system and allow the edge system to continue to operate offline. Subsequent object model synchronizations may be managed using delta-based communication and update notifications, which may be more efficient than full object model synchronizations. In some examples, an edge system may include a single edge device, an edge virtual machine (VM) hosted on a server or other computing device, or an edge cluster (e.g., tenant) that includes a cluster of edge devices.

The centralized IoT manager may include a stateless service that is hosted on a computing node or a computing node cluster. The centralized IoT manager may include multiple instances of one or more services to facilitate scalability of the IoT system. The centralized IoT manager is configured to centrally manage edge systems of the IoT system, including pushing software and/or configuration updates to the edge systems, providing data pipelines and other applications to the edge systems, storing/updating respective metadata for the IoT system in a database, etc.

The centralized IoT manager may communicate with the edge systems using a secure, two-way communication protocol, such as HTTPS, WSS, etc. For example, the centralized IoT manager may open a respective secure socket channel to communicate with each of the edge devices. The centralized IoT manager may use representational state transfer (REST) application programming interfaces (API) or remote procedure calls (RPCs) to communicate with the edge systems. In addition, rather than providing a full software package to each of the edge systems for an update to an application hosted on an edge system, the centralized IoT manager may provide delta changes between the new version and a current version of the application to each edge system to make updating edge systems more efficient. The centralized IoT manager may manage the software updates of the edge systems by pushing the software updates according to a schedule managed by the centralized IoT manager, rather than being managed by the edge systems periodically checking for updates.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of an Internet of Things (IoT) system 100, in accordance with an embodiment of the present disclosure. The IoT system 100 may include one or more of any of edge cluster(s) 110 coupled to respective data source(s) 120, edge device(s) 112 coupled to respective data source(s) 122, a server/cluster 114 coupled to respective data source(s) 124 and configured to host one or more edge virtual machines VM(s) 115. In some examples, an edge system may include a single edge device, an edge virtual machine (VM) hosted on a server or other computing device, or an edge cluster (e.g., tenant) that includes a cluster of edge devices.

The IoT system 100 may further include a central IoT computing system 140 coupled to the one or more of the edge cluster(s) 110, the edge device(s) 112, and/or the edge VM(s) 115 hosted on the server/cluster 114 via a network 130 to manage configuration and operation of the IoT system 100. The IoT system 100 may further include a data computing system 150 coupled to the network 130 and configured to receive, store, process, etc., data received from the one or more of the edge cluster(s) 110, the edge device(s) 112, and/or the server/cluster 114 via a network 130.

The network 130 may include any type of network capable of routing data transmissions from one network device (e.g., the edge cluster(s) 110, the edge device(s) 112, the server/cluster 114, a computing node of the central IoT computing system 140, and/or a computing node of the data computing system 150) to another. For example, the network 130 may include a local area network (LAN), wide area network (WAN), intranet, or a combination thereof. The network 130 may include a wired network, a wireless network, or a combination thereof.

The IoT system 100 may include one or more types of edge systems selected from any combination of the edge cluster(s) 110, the edge device(s) 112, and/or the edge VM(s) 115 hosted on the server/cluster 114. Each of the edge cluster(s) 110 (e.g., tenants) may include a respective cluster of edge nodes or devices that are configured to host a respective edge stack 111. The edge stack 111 may be distributed across multiple edge nodes, devices, or VMs of a respective one of the edge cluster(s) 110, in some examples. Each of the edge device(s) 112 may be configured to host a respective edge stack 113. Each of the edge VM(s) 115 may be configured to host a respective edge stack 116. In some examples, the server/cluster 114 may be included as part of the central IoT computing system 140 or the data computing system 150. For clarity, "edge" or "edge system" may refer to any of the edge cluster(s) 110, the edge device(s) 112, and/or the edge VM(s) 115 hosted on the server/cluster 114. The edge stacks (e.g., any of the edge stack 111, the edge stack 113, and/or the edge stack 116) may include software configured to operate the respective edge or edge system in communication between one or more of the respective data sources (e.g., the data source(s) 120, the data source(s) 122, and/or the data source(s) 124). The software may include instructions that are stored on a computer readable medium (e.g., memory, disks, etc. that is executable by one or more processor units (e.g., central processor units (CPUs), graphic processor units (GPUs), tensor processing units (TPUs), hardware accelerators, video processing units (VPUs), etc.) to perform functions, methods, etc., described herein.

The data source(s) 120, the data source(s) 122, and the data source(s) 124 ("data sources") may each include one or more devices configured to receive and/or generate respective source data. The data sources may include sensors (e.g., electrical, temperature, matter flow, movement, position, biometric data, or any other type of sensor), cameras, transducers, any type of RF receiver, or any other type of device configured to receive and/or generate source data.

Each of the edge stacks may include one or more data pipelines and/or applications. In some examples, some data pipelines and/or applications may be configured to receive and process/transform source data from one or more of the data sources, other data pipelines, or combinations thereof. In some examples, a data pipeline may span across multiple edge systems. Each of the one or more data pipelines and/or applications may be configured to process respective received data based on respective algorithms or functions to provide transformed data. The data pipelines can be constructed using computing primitives and building blocks, such as VMs, containers, processes, or any combination thereof. In some examples, the data pipelines may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or API, with data ingestion and movement handled by connector components built into the data pipeline. Thus, data may be passed between containers of a data pipeline using API calls. In some examples, the edge stacks may further include respective machine learning (ML) inference services that are configured to load and execute respective ML model inferences to provide inference data that may be stored or provided at an output.

The centralized IoT manager 142 hosted on the central IoT computing system 140 may be configured to centrally manage configuration of each of the edge systems and data sources via a central control plane. The central IoT computing system 140 may include one or more computing nodes configured to host the centralized IoT manager 142. In some examples, the centralized IoT manager 142 may be distributed across a cluster of computing nodes of the central IoT computing system 140.

In some examples, the centralized IoT manager 142 may be configured to manage, for each of the edge systems, network configuration and security protocols, installed software (e.g., including data pipelines and applications), connected data source(s) (e.g., including type, category, identifiers, data communication protocols, etc.), connected data plane(s), communication between the edge systems and users, etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate (e.g., build, construct, update, etc.) and distribute data pipelines and applications to selected edge systems based on the configuration maintained for each edge system. For example, in response to a request for a new data pipeline associated with a particular type or category of data sources, the centralized IoT manager 142 may identify data sources having the particular type or category (e.g., or attribute), and identify respective edge systems are connected to the identified data sources of the particular type or category. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system.

Edge data and/or ML inference data may be provided from the edge systems to one or more respective data planes, such as the data plane 152 of the data cloud computing system 150, users, or other edge systems via the network 130. In some examples, the edge data may include some or all of the source data from one or more of the data sources, processed source data, data derived from the source data, combined source data, or any combination thereof. In some examples, the edge data may include and/or may be based on ML inference data. The data plane 152 may be configured to store the edge data, process the edge data, provide access to the edge data to clients, etc. The data computing system 150 may include one or more cloud platforms that includes a plurality of computing nodes configured to host one or more versions of the data plane 152.

In operation, the IoT system 100 may include any number and combination of data sources selected from the data source(s) 120, the data source(s) 122, and the data source(s) 124 that are ach configured to provide respective source data. The data sources of the IoT system 100 may collectively span any type of geographic area (e.g., across continents, countries, states, cities, counties, facilities, buildings, floors, rooms, systems, units, or any combination thereof). The number of data sources may range in the tens, hundreds, thousands, or more. The data sources may include sensors (e.g., electrical, temperature, matter flow, movement, position, biometric data, or any other type of sensor), cameras, transducers, any type of radio frequency (RF) receiver, or any other type of device configured to receive and/or generate source data.

Rather than each of the data sources independently sending all source data directly to a data plane or user, the IoT system 100 may include any number and combination of edge systems selected from any combination of the edge cluster(s) 110, the edge device(s) 112, and/or the edge VM(s) 115 hosted on the server/cluster 114 that are proximately located with and connected to respective data sources and are each configured to receive and select/process/transform the source data that is provided to the data plane or user. The edge systems within the IoT system 100 may include homogenous hardware and software architectures, in some examples. In other examples, the edge systems have a wide array of hardware and software architectures and capabilities. Each of the edge systems may be connected to a respective subset of data sources, and may host respective data pipelines and applications (e.g., included in the edge stacks, such as the edge stack 111, edge stack 113, or edge stack 116) that are configured to process source data from a respective one or more of the connected data sources and/or transformed data from other applications and/or data pipelines.

Each of the one or more data pipelines and/or applications may be configured to process and/or distribute respective transformed data based on received source data (e.g., or other edge data) using respective algorithms or functions. In some examples, the algorithms or functions may include any other user-specified or defined function to process/transform/select/etc. received data. In some examples, an edge system may provide the transformed data from a data pipeline or an application of the one or more data pipelines or applications of the edge stacks to a respective destination data plane, such as the data plane 152 of the data computing system 150 as edge data. In some examples, the edge systems may be configured to share edge data with other edge systems. The one or more data pipelines or applications of the edge stacks may be implemented using a containerized architecture that is managed via a container orchestrator. The data pipelines and/or applications communicate using API calls, in some examples. In some examples, ML inference services may be configured to receive a request for a ML model inference, and to load the requested ML model inference in an inference engine in response to the request to execute the ML model inference to provide inference data.

In some examples, the edge systems may cause transformed data from a data pipeline or an application, and/or inference data from the ML inference services to be provided to a respective data plane as edge data, such as the data plane 152 of the data computing system 150, using respective data plane communication interfaces, including application programming interfaces (APIs). The data computing system 150 may be a dedicated computing system, or may include a centralized analytics system hosted on a network of remote servers that are configured to store, manage, and process data (e.g., cloud computing system). The centralized IoT manager 142 hosted on the central IoT computing system 140 may be configured to centrally manage configuration of each of the edge systems and data sources. In some examples, the centralized IoT manager 142 may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate or update and distribute data pipelines and applications to selected edge systems based on the configuration maintained for each edge system. For example, in response to a request for a new data pipeline or application associated with a particular type or category of data sources, the centralized IoT manager 142 may identify data sources having the particular type or category, and identify respective edge systems are connected to the identified data sources of the particular type or category. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system. The data pipelines may be constructed using a group of containers (e.g., a pod) each configured to perform various functions within the data pipeline (e.g., subscriber, data processor, publisher, connectors that transform data for consumption by another container within the application or pod, etc.). In some examples, the centralized IoT manager 142 may be configured to define stages of a constructed data pipeline application using a user interface or REST API, with data ingestion and movement handled by the connector components built into the data pipeline.

The edge systems may provide the edge data and/or the ML inference data to one or more respective data planes, such as the data plane 152 of the data computing system 150, via the network 130. In some examples, the edge stacks may be configured to implement respective data plane communication interfaces, including APIs, to communicate with the one or more data planes. The data plane 152 may be configured to store the edge data, process the edge data, aggregate the edge data across the IoT system 100, provide access to the edge data to clients, or any combination thereof. The edge data received and processed at the data plane 152 may provide information about events, trends, health, etc., of the IoT system 100 based in data captured by the data sources.

In some examples, the centralized IoT manager 142 may be deployed in multiple instances that are each instance respectively configured to connect to a respective group of one or more edge systems. The centralized IoT manager 142 may further include a containerized system configured to: receive from a first instance of the plurality of instances of the centralized IoT manager 142 a request to publish a message on a communication channel; and in response to the request to publish the message, send the message to the communication channel. The communication channel may be established between a second instance of the plurality of instances of the centralized IoT manager 142 and a second edge system of the respective group of one or more edge systems. Publishing the message on the communication channel causes the second instance of the plurality of instances of the centralized IoT manager 142 to send the message to the second edge system.

The containerized system of the centralized IoT manager 142 may be further configured to, upon establishment of the communication channel between the second instance of the plurality of instances of the centralized IoT manager 142 and the second edge system, receive a channel number of the communication channel from the second instance of the centralized IoT manager 142. The centralized IoT manager 142 may receive a look up request from the first instance of the plurality of instances of the centralized IoT manager 142 for the communication channel number associated with the second edge system, and in response to the look up request, may provide the channel number of the second edge system to the first instance of the plurality of instances of the centralized IoT manager 142. The look up request may include an identity of the second edge system associated with the channel number. In some examples, the containerized system includes a publish/subscribe-to-channel map configured to store one or more communication channel numbers subscribed for receiving update notifications. The containerized system may also include an edge-to-channel map configured to store information associating edge devices to communication channels. In providing the channel number of the second edge device to the first instance of the centralized IoT manager 142, the containerized system may use the edge-to-channel map to determine the channel number based on the edge system.

In some examples, the centralized IoT manager 142 may be configured to form secure two-way communication with an edge system of the centralized IoT manager 142, and synchronize an object model with an edge object model for the edge system. The centralized IoT manager 142 may be further configured to maintain the edge system using delta change communications. For example, an instance of the centralized IoT manager 142 may be configured to form a communication with the edge system of the centralized IoT manager 142, and detect a change of entity on the edge system based on an operation of the edge system. The centralized IoT manager 142; may be further configured to determine one or more additional edge systems that have associations with the detected change of entity, and transmit a respective message to the one or more additional edge systems. Each respective message includes information about a change to a corresponding edge system of the one or more additional edge systems. The instance of the centralized IoT manager 142 may also be configured to, in response to a request for inventory from the edge system, provide the inventory of the IoT system 100 to the edge system. An edge system connected to the centralized IoT manager 142 may receive the respective message from the centralized IoT manager 142, update an inventory of the respective edge system based on the received respective message, and synchronize an application or a data pipeline of the respective edge system with the updated inventory.

In some examples, the centralized IoT manager 142 may be implemented in multiple instances. A first instance may be configured to: receive a user message to deploy a data pipeline to an edge system connected to a second instance of the centralized IoT manager 142, determine a communication channel for the edge system, and publish a message on the determined communication channel for the edge system. A second instance may be configured to: establish a communication channel with the edge system, store a channel identification of the communication channel with association with the edge system in the centralized IoT manager 142, and subscribe the communication channel to the centralized IoT manager 142 for receiving update notifications. The second instance may further receive the message published by the first instance of the centralized IoT manager 142, and in response to receiving the message, send the message to the edge system.

In some examples, the centralized IoT manager 142 may receive a request from an edge system for first authentication information, provide the first authentication information to the new edge system, and receive a login request from the new edge system. The login request may contain second authentication information. The centralized IoT manager 142 may verify the second authentication information, and upon verification of the second authentication information, may establish a secure communication channel with the new edge system.

Figure 2:
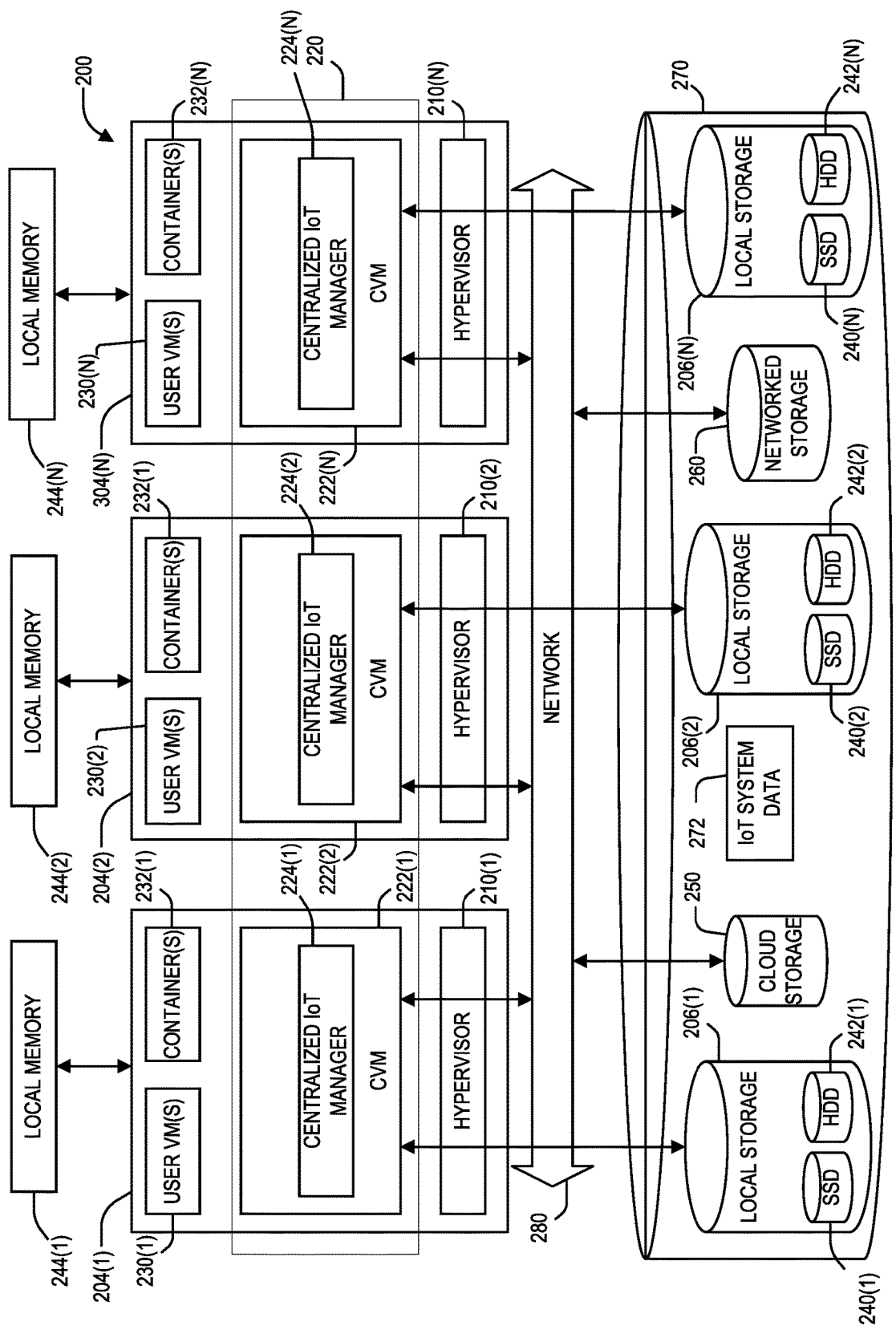
FIG. 2 is a block diagram of a distributed computing system, in accordance with an embodiment of the present disclosure.

FIG. 2 is a block diagram of a distributed computing system 200, in accordance with an embodiment of the present disclosure. The distributed computing system 200 generally includes computing nodes (e.g., host machines, servers, computers, nodes, etc.) 204(1)-(N) and storage 270 connected to a network 280. While FIG. 2 depicts three computing nodes, the distributed computing system 200 may include two or more than three computing nodes without departing from the scope of the disclosure. The network 280 may be any type of network capable of routing data transmissions from one network device (e.g., computing nodes 204(1)-(N) and the storage 270) to another. For example, the network 280 may be a local area network (LAN), wide area network (WAN), intranet, Internet, or any combination thereof. The network 280 may be a wired network, a wireless network, or a combination thereof. The central IoT computing system 140 of FIG. 1 may be configured to implement the distributed computing system 200, in some examples.

The storage 270 may include respective local storage 206(1)-(N), cloud storage 250, and networked storage 260. Each of the respective local storage 206(1)-(N) may include one or more solid state drive (SSD) devices 240(1)-(N) and one or more hard disk drives (HDD) devices 242(1)-(N). Each of the respective local storage 206(1)-(N) may be directly coupled to, included in, and/or accessible by a respective one of the computing nodes 204(1)-(N) without communicating via the network 280. The cloud storage 250 may include one or more storage servers that may be stored remotely to the computing nodes 204(1)-(N) and may be accessed via the network 280. The cloud storage 250 may generally include any type of storage device, such as HDDs, SSDs, optical drives, etc. The networked storage (or network-accessed storage) 260 may include one or more storage devices coupled to and accessed via the network 280. The networked storage 260 may generally include any type of storage device, such as HDDs, SSDs, optical drives, etc. In various embodiments, the networked storage 260 may be a storage area network (SAN).

Each of the computing nodes 204(1)-(N) may include a computing device configured to host a respective hypervisor 210(1)-(N), a respective controller virtual machine (CVM) 222(1)-(N), respective user (or guest) virtual machines (VMs) 230(1)-(N), and respective containers 232(1)-(N). For example, each of the computing nodes 204(1)-(N) may be or include a server computer, a laptop computer, a desktop computer, a tablet computer, a smart phone, any other type of computing device, or any combination thereof. Each of the computing nodes 204(1)-(N) may include one or more physical computing components, such as one or more processor units, respective local memory 244(1)-(N) (e.g., cache memory, dynamic random-access memory (DRAM), non-volatile memory (e.g., flash memory), or combinations thereof), the respective local storage 206(1)-(N), ports (not shown) to connect to peripheral input/output (I/O) devices (e.g., touchscreens, displays, speakers, keyboards, mice, cameras, microphones, environmental sensors, etc.).

Each of the user VMs 230(1)-(N) hosted on the respective computing node includes at least one application and everything the user VM needs to execute (e.g., run) the at least one application (e.g., system binaries, libraries, etc.). Each of the user VMs 230(1)-(N) may generally be configured to execute any type and/or number of applications, such as those requested, specified, or desired by a user. Each of the user VMs 230(1)-(N) further includes a respective virtualized hardware stack (e.g., virtualized network adaptors, virtual local storage, virtual memory, processor units, etc.). To manage the respective virtualized hardware stack, each of the user VMs 230(1)-(N) is further configured to host a respective operating system (e.g., Windows®, Linux®, etc.). The respective virtualized hardware stack configured for each of the user VMs 230(1)-(N) may be defined based on available physical resources (e.g., processor units, the local memory 244(1)-(N), the local storage 206(1)-(N), etc.). That is, physical resources associated with a computing node may be divided between (e.g., shared among) components hosted on the computing node (e.g., the hypervisor 210(1)-(N), the CVM 222(1)-(N), other user VMs 230(1)-(N), the containers 232(1)-(N), etc.), and the respective virtualized hardware stack configured for each of the user VMs 230(1)-(N) may reflect the physical resources being allocated to the user VM. Thus, the user VMs 230(1)-(N) may isolate an execution environment my packaging both the user space (e.g., application(s), system binaries and libraries, etc.) and the kernel and/or hardware (e.g., managed by an operating system). While FIG. 2 depicts the computing nodes 204(1)-(N) each having multiple user VMs 230(1)-(N), a given computing node may host no user VMs or may host any number of user VMs.

Rather than providing hardware virtualization like the user VMs 230(1)-(N), the respective containers 232(1)-N) may each provide operating system level virtualization. Thus, each of the respective containers 232(1)-(N) is configured to isolate the user space execution environment (e.g., at least one application and everything the container needs to execute (e.g., run) the at least one application (e.g., system binaries, libraries, etc.)) without requiring an operating system to manage hardware. Individual ones of the containers 232(1)-(N) may generally be provided to execute any type and/or number of applications, such as those requested, specified, or desired by a user. Two or more of the respective containers 232(1)-(N) may run on a shared operating system, such as an operating system of any of the hypervisor 210(1)-(N), the CVM 222(1)-(N), or other user VMs 230 (1)-(N). In some examples, an interface engine may be installed to communicate between a container and an underlying operating system. While FIG. 2 depicts the computing nodes 204(1)-(N) each having multiple containers 232(1)-(N), a given computing node may host no containers or may host any number of containers.

Each of the hypervisors 210(1)-(N) may include any type of hypervisor. For example, each of the hypervisors 210(1)-(N) may include an ESX, an ESX(i), a Hyper-V, a KVM, or any other type of hypervisor. Each of the hypervisors 210(1)-(N) may manage the allocation of physical resources (e.g., physical processor units, volatile memory, the storage 270) to respective hosted components (e.g., CVMs 222(1)-(N), respective user VMs 230(1)-(N), respective containers 232(1)-(N)) and performs various VM and/or container related operations, such as creating new VMs and/or containers, cloning existing VMs and/or containers, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors 210(1)-(N) may all include a common hypervisor type, may all include different hypervisor types, or may include any combination of common and different hypervisor types.

The CVMs 222(1)-(N) may provide services for the respective hypervisors 210(1)-(N), the respective user VMs 230(1)-(N), and/or the respective containers 232(1)-(N) hosted on a respective computing node of the computing nodes 204(1)-(N). For example, each of the CVMs 222(1)-(N) may execute a variety of software and/or may serve the I/O operations for the respective hypervisor 210(1)-(N), the respective user VMs 230(1)-(N), and/or the respective containers 232(1)-(N) hosted on the respective computing node 204(1)-(N). The CVMs 222(1)-(N) may communicate with one another via the network 280. By linking the CVMs 222(1)-(N) together via the network 280, a distributed network (e.g., cluster, system, etc.) of the computing nodes 204(1)-(N) may be formed. In an example, the CVMs 222(1)-(N) linked together via the network 280 may form a distributed computing environment (e.g., a distributed virtualized file server) 220 configured to manage and virtualize the storage 270. In some examples, a SCSI controller, which may manage the SSD devices 240(1)-(N) and/or the HDD devices 242(1)-(N) described herein, may be directly passed to the respective CVMs 222(1)-(N), such as by leveraging a VM-Direct Path. In the case of Hyper-V, the SSD devices 240(1)-(N) and/or the HDD devices 242(1)-(N) may be passed through to the respective CVMs 222(1)-(N).

The CVMs 222(1)-(N) may coordinate execution of respective services over the network 280, and the services running on the CVMs 222(1)-(N) may utilize the local memory 244(1)-(N) to support operations. The local memory 244(1)-(N) may be shared by components hosted on the respective computing node 204(1)-(N), and use of the respective local memory 244(1)-(N) may be controlled by the respective hypervisor 210(1)-(N). Moreover, multiple instances of the same service may be running throughout the distributed system 200. That is, the same services stack may be operating on more than one of the CVMs 222(1)-(N). For example, a first instance of a service may be running on the CVM 222(1), a second instance of the service may be running on the CVM 222(2), etc.

In some examples, the CVMs 222(1)-(N) may be configured to collectively manage a centralized IoT manager of an IoT system, with each of the CVMs 222(1)-(N) hosting a respective centralized IoT manager instance 224(1)-(N) on an associated operating system to form the centralized IoT manager. In some examples, one of the centralized IoT manager instances 224(1)-(N) may be designated as a master centralized IoT manager instance configured to coordinate collective operation of the centralized IoT manager instances 224(1)-(N). The centralized IoT manager instances 224(1)-(N) may be configured to manage configuration of (e.g., network connectivity information, connected data sources, installed application and other software versions, data pipelines, etc.), as well as generate and distribute data pipelines to edge systems (e.g., any of an edge device of the edge cluster(s) 110, the edge device(s) 112, the edge VM(s) 115 of the server/cluster 114, etc.) of an IoT system to centrally manage operation of the IoT system. The centralized IoT manager instances 224(1)-(N) may be configured to interface with multiple edge system types and interfaces via a control plane.

To manage the operation of the IoT system, the centralized IoT manager instances 224(1)-(N) may retrieve data from and store data to IoT system data 272 of the storage 270. The IoT system data 272 may include metadata and other data corresponding to each edge system, data source, user, site, etc. within the IoT system. For example, the IoT system data 272 may include hardware configurations, software configurations, network configurations, edge system and/or data source type, categories, geographical and physical locations, authentication information, associations between edge systems and data sources, associations between edge systems and users, user access permissions, etc., or any combination thereof.

In some examples, the IoT system data 272 may include metadata that is represented by an object model, which classifies metadata into different entity. Examples of entities may include a tenant (e.g., a group of one or more edge devices or systems), an edge system, a user, an application, a data source, a data pipeline, a function, a cloud profile, a container registry profile and/or a category. A tenant may include an instance per customer and tenant data key. An edge may include metadata for an edge device or system, such as serial number, private key, etc. A user may include user name, an email, a password, a role etc. An application may include application specifications. For example, a containerized system application (e.g., Kubernetes) may include YAML specifications. A data source may include abstraction for IoT sensors and gateways. A data pipeline may include metadata for a data pipeline, e.g., from input (e.g., data source or another data pipeline) through functions to output to cloud or edge data service. A function may include script or transformation, (e.g., Lambda runtime). A cloud profile may include a customer's cloud credential for cloud provider. A container registry profile may include a customer's container registry credential. A category may include name and values, used as a selector, e.g., Kubernetes labels for Kubernetes application.

Generally, the CVMs 222(1)-(N) may be configured to control and manage any type of storage device of the storage 270. The CVMs 222(1)-(N) may implement storage controller logic and may virtualize all storage hardware of the storage 270 as one global resource pool to provide reliability, availability, and performance. IP-based requests may be generally used (e.g., by the user VMs 230(1)-(N) and/or the containers 232(1)-(N)) to send I/O requests to the CVMs 222(1)-(N). For example, the user VMs 230(1) and/or the containers 232(1) may send storage requests to the CVM 222(1) using an IP request, the user VMs 230(2) and/or the containers 232(2) may send storage requests to the CVM 222(2) using an IP request, etc. The CVMs 222(1)-(N) may directly implement storage and I/O optimizations within the direct data access path.

Note that the CVMs 222(1)-(N) provided as virtual machines utilizing the hypervisors 210(1)-(N). Since the CVMs 222(1)-(N) run "above" the hypervisors 210(1)-(N), some of the examples described herein may be implemented within any virtual machine architecture, since the CVMs 222(1)-(N) may be used in conjunction with generally any type of hypervisor from any virtualization vendor.

Virtual disks (vDisks) may be structured from the storage devices in the storage 270. A vDisk generally refers to the storage abstraction that may be exposed by the CVMs 222(1)-(N) to be used by the user VMs 230(1)-(N) and/or the containers 232(1)-(N). Generally, the distributed computing system 200 may utilize an IP-based protocol, such as an Internet small computer system interface (iSCSI) or a network file system interface (NFS), to communicate between the user VMs 230(1)-(N), the containers 232(1)-(N), the CVMs 222(1)-(N), and/or the hypervisors 210(1)-(N). Thus, in some examples, the vDisk may be exposed via an iSCSI or a NFS interface, and may be mounted as a virtual disk on the user VMs 230(1)-(N) and/or operating systems supporting the containers 232(1)-(N). iSCSI may generally refer to an IP-based storage networking standard for linking data storage facilities together. By carrying SCSI commands over IP networks, iSCSI can be used to facilitate data transfers over intranets and to manage storage over any suitable type of network or the Internet. The iSCSI protocol may allow iSCSI initiators to send SCSI commands to iSCSI targets at remote locations over a network. NFS may refer to an IP-based file access standard in which NFS clients send file-based requests to NFS servers via a proxy folder (directory) called "mount point".

During operation, the user VMs 230(1)-(N) and/or operating systems supporting the containers 232(1)-(N) may provide storage input/output (I/O) requests to the CVMs 222(1)-(N) and/or the hypervisors 210(1)-(N) via iSCSI and/or NFS requests. Each of the storage I/O requests may designate an IP address for a CVM of the CVMs 222(1)-(N) from which the respective user VM desires I/O services. The storage I/O requests may be provided from the user VMs 230(1)-(N) to a virtual switch within a hypervisor of the hypervisors 210(1)-(N) to be routed to the correct destination. For examples, the user VM 230(1) may provide a storage request to the hypervisor 210(1). The storage I/O request may request I/O services from a CVM of the CVMs 222(1)-(N). If the storage I/O request is intended to be handled by a respective CVM of the CVMs 222(1)-(N) hosted on a same respective computing node of the computing nodes 204(1)-(N) as the requesting user VM (e.g., CVM 222(1) and the user VM 230(1) are hosted on the same computing node 204(1)), then the storage I/O request may be internally routed within the respective computing node of the computing node of the computing nodes 204(1)-(N). In some examples, the storage I/O request may be directed to respective CVM of the CVMs 222(1)-(N) on another computing node of the computing nodes 204(1)-(N) as the requesting user VM (e.g., CVM 222(1) is hosted on the computing node 204(1) and the user VM 230(2) is hosted on the computing node 204(2)). Accordingly, a respective hypervisor of the hypervisors 210(1)-(N) may provide the storage request to a physical switch to be sent over the network 280 to another computing node of the computing nodes 204(1)-(N) hosting the requested CVM of the CVMs 222(1)-(N).

The CVMs 222(1)-(N) may collectively manage the storage I/O requests between the user VMs 230(1)-(N) and/or the containers 232(1)-(N) of the distributed computing system and a storage pool that includes the storage 270. That is, the CVMs 222(1)-(N) may virtualize I/O access to hardware resources within the storage pool. In this manner, a separate and dedicated CVM of the CVMs 222(1)-(N) may be provided each of the computing nodes 204(1)-(N) the distributed computing system 200. When a new computing node is added to the distributed computing system 200, it may include a respective CVM to share in the overall workload of the distributed computing system 200 to handle storage tasks. Therefore, examples described herein may be advantageously scalable, and may provide advantages over approaches that have a limited number of controllers. Consequently, examples described herein may provide a massively-parallel storage architecture that scales as and when computing nodes are added to the system.

The distributed system 200 may include a centralized IOT manager that includes one or more of the centralized IoT manager instances 224(1)-(N) hosted on the CVMs 222(1)-(N). The centralized IoT manager may be configured to centrally manage configuration of edge systems and data sources of the corresponding IoT system. In some examples, the centralized IoT manager may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

In some examples, a workload of the centralized IoT manager may be distributed across two or more of the computing nodes 204(1)-(N) via the respective centralized IoT manager instances 224(1)-(N). In other examples, the workload of the centralized IoT manager may reside in a single one of the centralized IoT manager instances 224(1)-(N). A number of centralized IoT manager instances 224(1)-(N) running on the distributed computing system 200 may depend on a size of the management workload associated with the IoT system (e.g., based on a number of edge systems, data sources, users, etc., level of activity within the IoT system, frequency of updates, etc.), as well as compute resources available on each of the computing nodes 204(1)-(N). One of the centralized IoT manager instances 224(1)-(N) may be designated a master centralized server manager that is configured to monitor workload of the centralized IoT manager instances 224(1)-(N), and based on the monitored workload, allocate management of respective edge systems and users to each of the centralized IoT manager instances 224(1)-(N) and start additional centralized IoT manager instances when compute resources available to the centralized IoT manager have fallen below a defined threshold. Thus, while FIG. 2 depicts each of the CVMs 222(1)-(N) hosting a respective one of the centralized IoT manager instances 224(1)-(N), it is appreciated that some of the CVMs 222(1)-(N) may not have an active centralized IoT manager instances 224(1)-(N) running without departing from the scope of the disclosure.

In some examples, the centralized IoT manager may be configured to generate or update and distribute data pipelines and applications to selected edge systems based on the configuration maintained for each edge system. The data pipelines can be constructed using computing primitives and building blocks, such as VMs, containers, processes, or any combination thereof. In some examples, the data pipelines may be constructed using a group of containers (e.g., a pod) that each perform various functions within the data pipeline (e.g., subscriber, data processor, publisher, connectors that transform data for consumption by another container within the application or pod, etc.) In some examples, the definition of stages of a constructed data pipeline application may be described using a user interface or REST API, with data ingestion and movement handled by connector components built into the data pipeline. Thus, data may be passed between containers of a data pipeline using API calls.

In some examples, an instance of the IoT manager instances 224(1)-(N) may be respectively connected to a corresponding edge system of a plurality of edge systems. The IoT manager instance may further include a containerized system configured to receive, from a first instance of the IoT manager instances 224(1)-(N), a request to publish a message on a communication channel, and in response to the request to publish the message, send the message to the communication channel. The communication channel is established between a second instance of the IoT manager instances 224(1)-(N) and a second edge system of the plurality of edge systems. Publishing of the message on the communication channel may cause the second instance of the IoT manager instances 224(1)-(N) to send the message to the second edge system.

The containerized system may be further configured to, upon establishment of the communication channel between the second instance of the IoT manager instances 224(1)-(N) and the second edge system, receive a channel number of the communication channel from the second instance, and receive a look up request from the first instance of the IoT manager instances 224(1)-(N) for the communication channel number associated with the second edge system. In response to the look up request, provide the channel number of the second edge system to the first instance of the IoT manager instances 224(1)-(N). The look up request may include an identity of the second edge system associated with the channel number. In some examples, the containerized system includes a publish/subscribe-to-channel map configured to store one or more communication channel numbers subscribed for receiving update notifications. The containerized system may also include an edge-to-channel map configured to store information associating edge systems to communication channels. In providing the channel number of the second edge system to the first instance of the IoT manager instances 224(1)-(N), the containerized system may use the edge-to-channel map to determine the channel number based on the edge system.

In some examples, an instance of the IoT manager instances 224(1)-(N) may be configured to: form secure two-way communication with an edge system of the IoT system, synchronize an object model with an edge object model for the edge system, and/or maintain the edge system using delta change communications. For example, an instance of the IoT manager instances 224(1)-(N) may be configured to form a communication with the edge system of the IoT system, and detect a change of entity on the edge system based on an operation of the edge system. The instance of the IoT manager instances 224(1)-(N), may determine one or more additional edge systems that have associations with the detected change of entity, and transmit a respective message to the one or more additional edge systems. Each respective message may include information about a change to a corresponding edge system of the one or more additional edge systems. The instance of the IoT manager instances 224(1)-(N) may also be configured to, in response to a request for inventory from the edge system, provide the inventory of the IoT system to the edge system. An edge system connected to an instance of the IoT manager instances 224(1)-(N) may receive the respective message from the instances of the IoT manager instances 224(1)-(N), update an inventory of the respective edge system based on the received respective message, and synchronize an application or a data pipeline of the respective edge system with the updated inventory.

In some examples, a first instance of the IoT manager instances 224(1)-(N) may be configured to receive a user message to deploy a data pipeline to an edge system connected to a second instance of the IoT manager instances 224(1)-(N), and determine a communication channel for the edge system. The first instance of the IoT manager instances 224(1)-(N) may publish a message on the determined communication channel for the edge system. A second instance of the IoT manager instances 224(1)-(N) may be configured to establish a communication channel with the edge system, and store a channel identification of the communication channel with association with the edge system at the IoT manager instances 224(1)-(N) (e.g., the centralized IoT manager), and subscribe the communication channel to the IoT system data 272 for receiving update notifications. A second instance of the IoT manager instances 224(1)-(N) may further receive the message published by the first instance of the IoT manager instances 224(1)-(N), and in response to receiving the message, send the message to the edge system.

In some examples, an instance of the IoT manager instances 224(1)-(N) may receive a request from an edge system for first authentication information, and provide the first authentication information to the new edge system. The instance of the IoT manager instances 224(1)-(N) may receive a login request from the new edge system that includes second authentication information. The instance of the IoT manager instances 224(1)-(N) may verify the second authentication information, and upon verification of the second authentication information, establish a secure communication channel with the new edge system.

Figure 3:
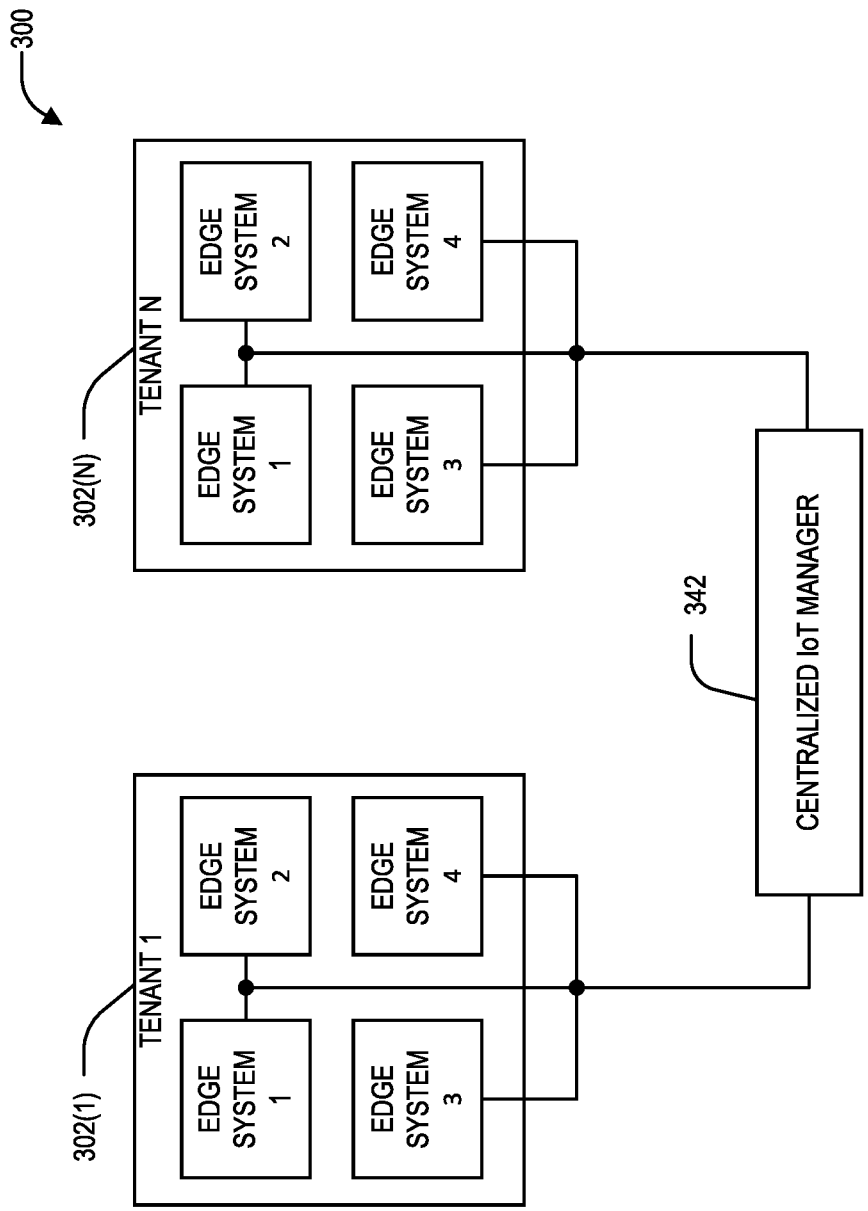
FIG. 3 is a block diagram of an IoT system topology, in accordance with an embodiment of the present disclosure.

FIG. 3 is a block diagram of an example IoT system 300, in accordance with an embodiment of the present disclosure. Examples described herein include a scalable centralized Internet of Things (IoT) manager of an IoT system capable of expanding as the number of tenants and edge systems within an IoT system increases. In some examples, an IoT system 300 may include tenants 302(1),-(N). Each of the tenants 302(1)-(N) may include one or more respective edge systems. In other words, an edge system in the IoT system 300 may belong to a respective tenant of the tenants 302(1)-(N). Each of the tenants 302(1)-(N) may have any number of edge systems, or have no edge systems. For example, a tenant of the tenants 302(1)-(N) may include an edge cluster (e.g., 110 in FIG. 1), and an edge system may include any of the one or more of the edge cluster(s) 110, the edge device(s) 112, and/or the edge VM(s) 115 hosted on the server/cluster 114 of FIG. 1. In some examples, an edge system may include an edge device located in a tenant's private data center. Each edge device or system may include a containerized system (e.g., Kubernetes) cluster in itself. The IoT system 300 may also include a centralized IoT manager 342. In some examples, each of the edge systems may be in communication with the centralized IoT manager 342 and federated by the centralized IoT manager 342. The centralized IoT manager 342 may be operated in a cloud computing environment and provide a control plane for the federation of edge systems across multiple tenants.

In some examples, an edge system of the tenants 302(1)-(N) may include an edge stack. The edge stack may provide one or more services. In a non-limiting example, an edge stack may be configured to run one or more applications. For example, an edge stack may include a container as a service to run containerized system applications. By supporting known/off-the-shelf containerized system specifications (e.g., Kubernetes), the learning curve required of a user who wants to deploy an application may be reduced. The IoT system 300 may allow the user to define applications, such as via Kubernetes YAML specifications and control the deployment scope and lifecycle of such applications.

In some examples, the edge stack may also include a data plane, wherein the data plane connects the edge system to the cloud. The data plane may also connect one or more sensors to an edge system. In a non-limiting example, the IoT system 300 may include a streaming data bus to facilitate data transfers between edge systems and the centralized IoT manager 342. The IoT system 300 may also include built-in functions to allow a user to define custom functions and runtimes to transform the data along the data bus.

The edge stack may store data in edge data services or send data to cloud data services of customer's cloud account. In some examples, the data may be sent from an edge to a cloud independent of the centralized IoT manager 342. The communication between an edge system and the centralized IoT manager 342 is further explained.

In some examples, the IoT manager may be configured to manage metadata of the system for each tenant and persist such metadata. The centralized IoT manager 342 may be an example implemented of the centralized IoT manager (e.g., the IoT manager 142 of FIG. 1, the centralized IoT manager formed by the IoT manager instances 224(1)-(N) of FIG. 2). In some examples, the metadata of the IoT system 300 may be stored in IoT system data (e.g., the IoT system data 272 of FIG. 2). The metadata may be represented by object model, which classifies metadata into different entity. Examples of entities may include a tenant, an edge, a user, an application, a data source, a data pipeline, a function, a cloud profile, a container registry profile and/or a category. A tenant may include an instance per customer and tenant data key. A tenant may include one or more edge systems. An edge may include metadata for an edge system, such as serial number, private key, etc. A user may include user name, an email, a password, a role etc. An application may include application specifications. For example, a containerized system application (e.g., Kubernetes) may include YAML specifications. A data source may include abstraction for IoT sensors and gateways. A data pipeline may include metadata for a data pipeline, e.g., from input (e.g., data source or another data pipeline) through functions to output to cloud or edge data service. A function may include script or transformation, e.g., Lambda runtime. A cloud profile may include a customer's cloud credential for cloud provider. A container registry profile may include a customer's container registry credential. A category may include name and values, used as a selector, e.g., Kubernetes labels for Kubernetes application.

In some examples, the centralized IoT manager 342 may include a set of APIs to expose its functionality. In some examples, the API may be a REST API. For example, the API may include a set of functions for each entity. In some examples, the set of functions for the API of the IoT manager may include a GET, PUT, POST and DELETE for each type of entity. For example, the centralized IoT manager 342 API may include POST/edges for creating an edge system having a payload that includes a representation of edge object, PUT/edges/<edge id> for updating an edge system having a payload that is an edge object. DELETE/edges/<edge id> for deleting an edge system, and GET/edges to retrieve all edge systems for the current tenant (e.g., a response is an array of edges). The various representations, such as edge object or array of edges, may be in any suitable format, such as JavaScript Object Notation (JSON). In some or other examples, the API of the centralized IoT manager 342 may include create, read, update and delete (CRUD) operations on the metadata entities.

In some examples, the centralized IoT manager 342 may include a web-based user interface to enable a user to manage a respective IoT system 300. For example, a user interface (UI), e.g., a web-based UI, may use REST API to communicate with the centralized IoT manager 342. In some examples, the API (e.g., REST API) of the centralized IoT manager 342 may be available directly from the UI. In some examples, the REST API may also be accessible to one or more edge systems to synchronize with the centralized IoT manager 342.

In some examples, the IoT system 300 may include communication links between each of the edge systems and the centralized IoT manager 342. For example, the communication link may be a two-way channel (e.g., in WebSocket), which does not require any network setup other than the HTTPS outbound connection. In some examples, the centralized IoT manager 342 may be configured to monitor operations on an edge system and notify other edge systems of entity changes as a result of an operation on the edge system. For example, the centralized IoT manager 342 may monitor write operations on each of the edge system. When a write operation has occurred on an edge system, entity changes may occur on other edge systems. As such, the centralized IoT manager 342 may transmit a notification message, e.g., via a PUSH function, to other affected edge systems.

In a non-limiting example, the communication link between an edge system and the centralized IoT manager 342 may include a messaging protocol (e.g., over a web socket notification). When an application is created or updated on an edge system, the centralized IoT manager 342 may transmit an onCreateApplication or an onUpdateApplication message to affected edge systems, where the affected edge systems may occur entity changes as a result of the write operation on the edge system. The payload for messages sent to the edge systems is the application created or updated. Similarly, when an application is deleted at an edge system, the centralized IoT manager 342 may send an onDeleteApplication message to affected edge systems, where the payload of the message is the Application ID.

Figure 4A:
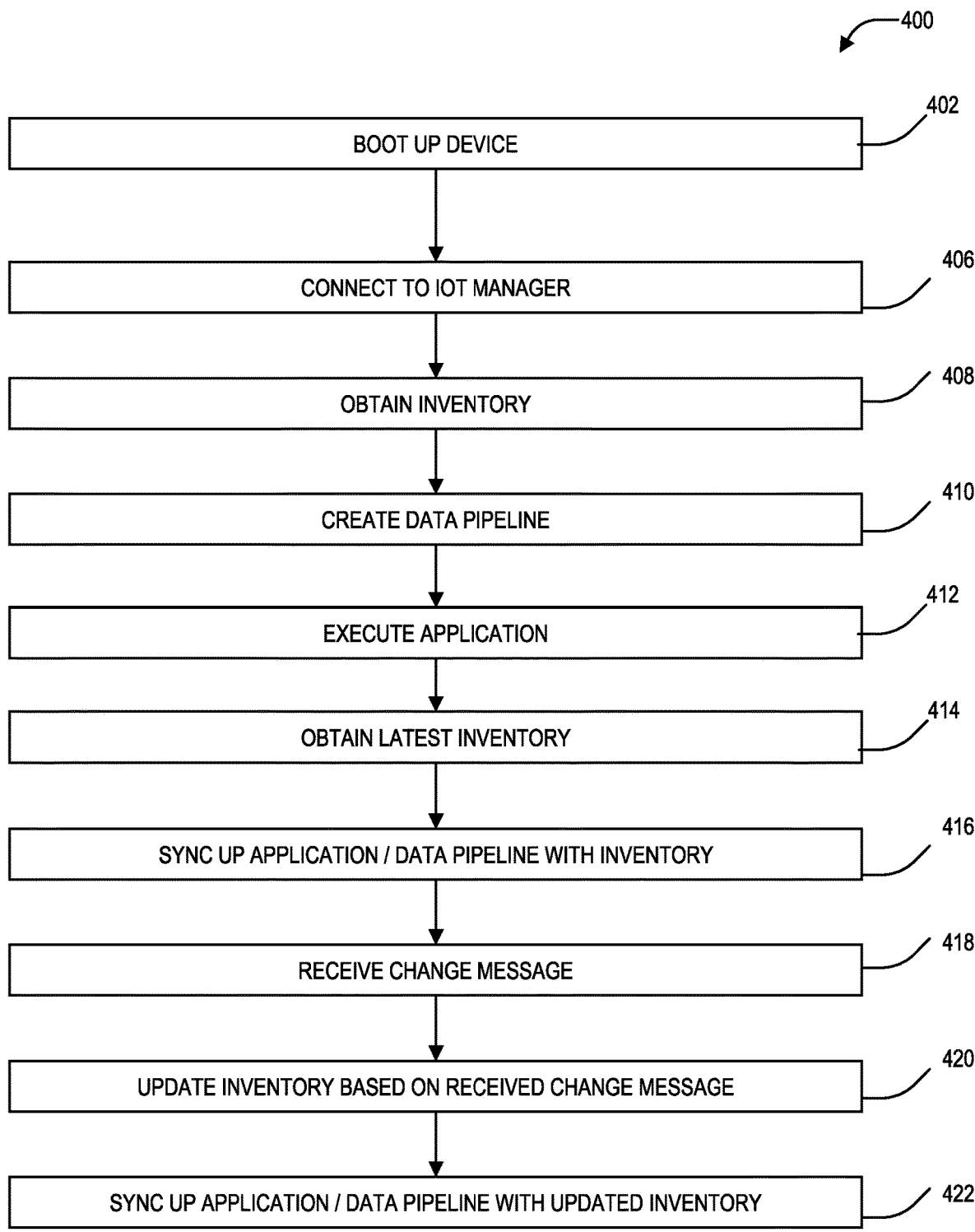
FIG. 4A is a flow diagram of an example process that may be implemented to provide software update in an edge device in accordance with an embodiment of the present disclosure.

FIG. 4A is a flow diagram of an example process that may be implemented in an edge system to provide an update in an edge system in accordance with an embodiment of the present disclosure. In some examples, the process in FIG. 4A may be implemented in any of the one or more of the edge cluster(s) 110, the edge device(s) 112, and/or the edge VM(s) 115 hosted on the server/cluster 114 of FIG. 1 and/or any edge system of any of the tenants 302(1)-(N) of FIG. 3. A process 400 may include booting up an edge system at 402. Once an edge system boots up, if it is not yet connected to the IoT manager, the process 400 may establish a secure communication between the edge system and the IoT manager at operation 406 using an authentication method. The IoT manager may include the centralized IoT manager 142 of FIG. 1, the centralized IoT manager formed by the IoT manager instances 224(1)-(N) of FIG. 2, the centralized IoT manager 342 of FIG. 3, or any combination thereof.

Figure 4B:
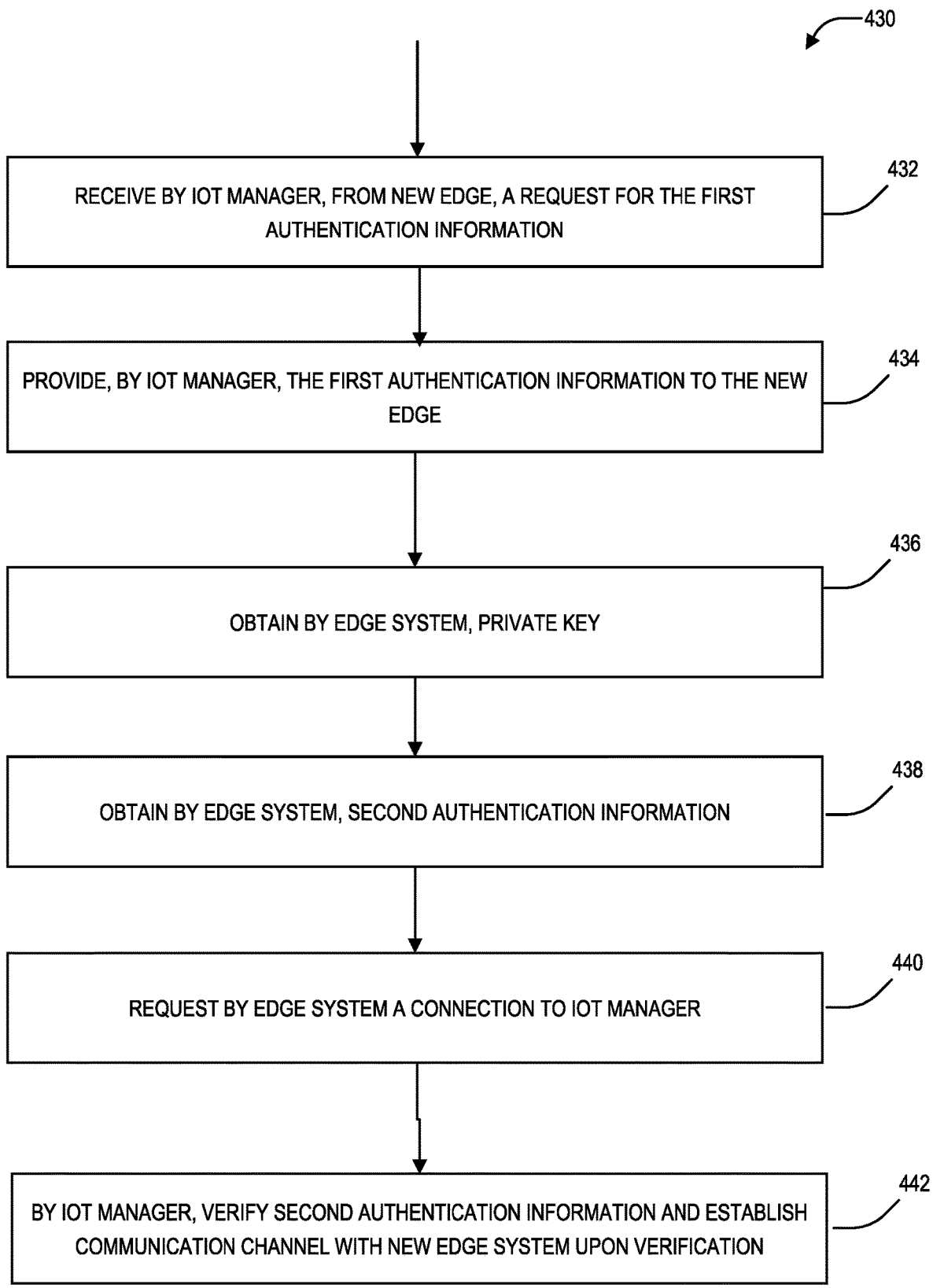
FIG. 4B is a flow diagram of an example process that may be implemented in an edge device to establish a secure communication between an edge device and an IoT manager in accordance with an embodiment of the present disclosure.

FIG. 4B is a flow diagram of an example process that may be implemented in an edge device to establish a secure communication between an edge system and an IoT manager in accordance with an embodiment of the present disclosure. In some examples, a process 430 in FIG. 4B may be implemented in any of the one or more of the edge cluster(s) 110, the edge device(s) 112, and/or the edge VM(s) 115 hosted on the server/cluster 114 of FIG. 1 and/or any edge system of any of the tenants 302(1)-(N) of FIG. 3. The IoT manager may include the centralized IoT manager 142 of FIG. 1, the centralized IoT manager formed by the IoT manager instances 224(1)-(N) of FIG. 2, the centralized IoT manager 342 of FIG. 3, or any combination thereof.

The process 430 may include receiving by an IoT manager, from a new edge system, a request for a first authentication information at operation 432. In some examples, the new edge system may ping the IoT manager periodically using its serial number. In response, the process 430 may include, at the IoT manager, receiving a device serial number from an edge device, looking up the serial number of the edge device, obtaining the authentication information for the edge device based on the serial number, and providing the authentication information to the new edge system at operation 434. For example, in response to the edge system requesting for authentication information, the IoT manager may return edge object metadata. The edge object metadata may include authentication information. The process 430 may further include, at the edge system, obtaining a private key at operation 436. Once the private key is obtained, the process 430 may include, by the edge system, obtaining authentication information at operation 438. For example, the edge system may invoke the/login REST API to obtain a secure token from the IoT manager. In response, the IoT manager may obtain the secure token and transmit the secure token to the edge device. In some examples, the token may be a JSON Web Token (JWT) that includes a set of information between the edge system and the IoT manager. For example, a JWT Token may include authentication information. Once the secure token is obtained, the process 430 may further include, by edge system, establishing a communication with the IoT manager using the secure token at operation 440. In response, at operation 442, the IoT manager may verify the secure token provided by the edge system, and if the secure token is verified, establish a safe communication channel with the new edge system.

Returning to FIG. 4A, once the communication channel is established between the edge system and the IoT manager, the process 400 may include invoking APIs of the IoT manager to obtain inventory at 408. The inventory may include connected data sources, data pipelines and applications, hardware resources, etc. or any combination thereof. Subsequently, the process 400 may create data pipeline at 410 and executing application at 412 based on the information contained in the inventory. Alternatively, and/or additionally, once an edge system is onboard, upon booting up, the process 400 may include synchronizing with the IoT manager to obtain the latest inventory at 414. The process 400 may further sync up its application/data pipeline with the inventory at 416.

In some examples, when an edge system vice creates a new application/data pipeline or update an existing application or data pipeline, the IoT manager may determine all other edge systems within the tenant that need to receive change information. For example, an application running on one edge system may have access to one or more other edge systems within the tenant. When the application is deleted from the edge system, the associations of the application at each of the other edge systems will be affected. The IoT manager may notify these edge systems of the change of entity (e.g., application on the edge system). For example, the IoT manager may send a message to other affected edge systems within the tenant. In a non-limiting example, the message may be transmitted from the IoT manager to each of the affected edge systems via a connected web socket channel. In some examples, the payload for the message may include information about the change to the edge system (e.g., the deletion of an application).

With further reference to FIG. 4A, the process 400 may include receiving a change message at 418. The change message may be transmitted from the IoT manager in response to a change of entity on another edge system. The process 400 may further include updating the inventory at 420 based on the received change message. The process 400 may further include synchronizing the application/data pipeline state on the edge system with the updated inventory at 422. Such operations ensure the edge system has the latest inventory.

Figure 5:
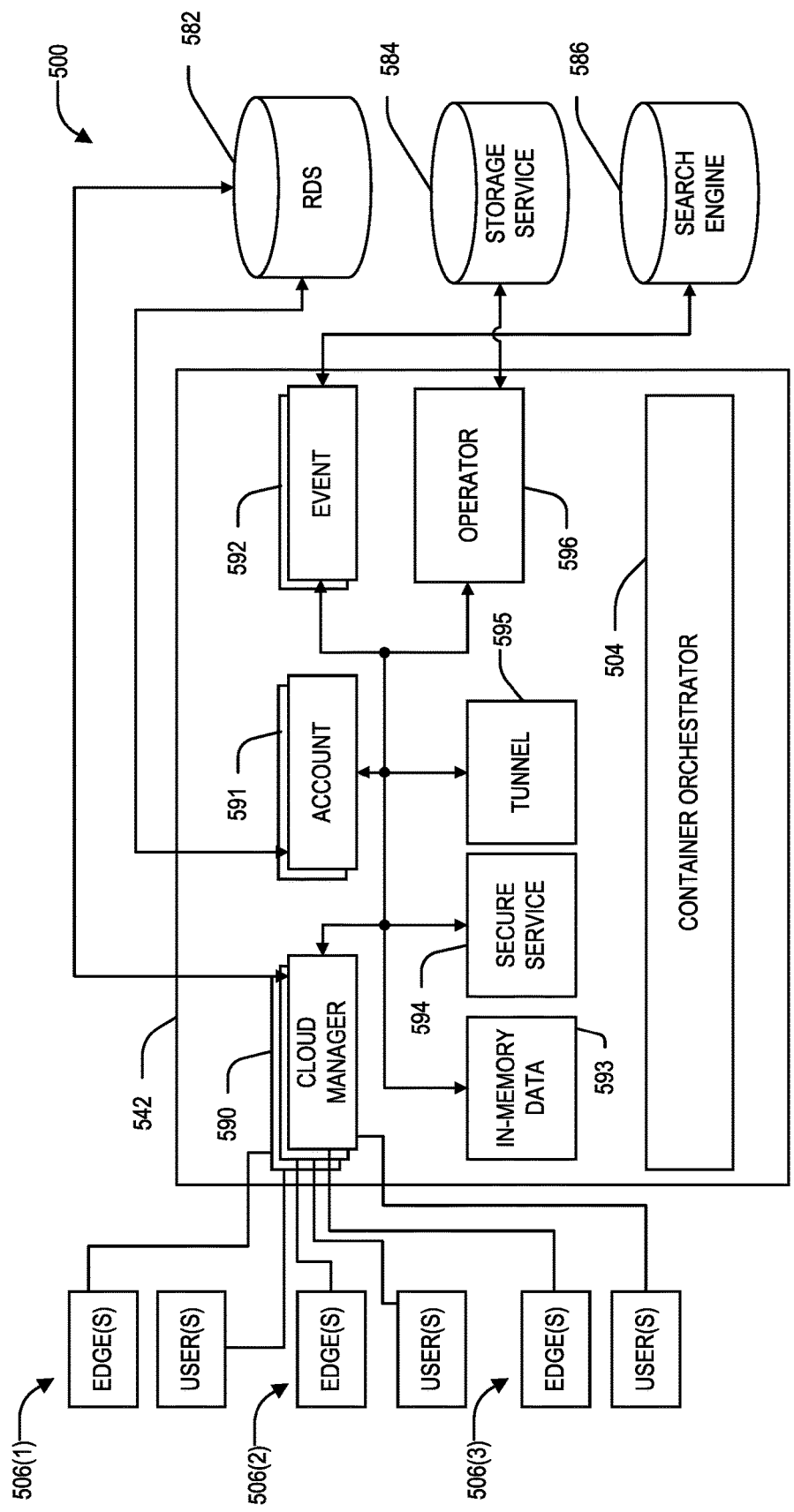
FIG. 5 is a block diagram of a centralized IoT manager of an IoT system, in accordance with an embodiment of the present disclosure.

FIG. 5 is a block diagram of an IoT manager 542 of an IoT system 500 in accordance with an embodiment of the present disclosure. The IoT system may include the IoT manager 542 coupled to edge system(s) and user(s) 506(1)-(3), relational data base service (RDS) 582, storage service 584, and a search engine 586. In some examples, the IoT manager 542 may be implemented in the centralized IoT manager 142 of FIG. 1, the centralized IoT manager formed by the IoT manager instances 224(1)-(N) of FIG. 2, the centralized IoT manager 342 of FIG. 3, or any combination thereof. The edge system(s) of the edge system(s) and user(s) 506(1)-(3) may each include any of the one or more of the edge cluster(s) 110, the edge device(s) 112, and/or the edge VM(s) 115 hosted on the server/cluster 114 of FIG. 1 and/or any edge system of any of the tenants 302(1)-(N) of FIG. 3.

In some examples, the IoT manager 542 may include one or more services. Examples of services include cloud manager service 590, account service 591, event service 592, operator service 596. In some examples, the cloud manager service 590 may be configured to store data, e.g., the APIs (e.g., REST API) for IoT manager 542, user interface associated with API, configuration data for communication links (e.g., WebSocket) between IoT manager 542 and each of the edge systems. In some examples, the cloud manager service 590 may be configured to expose external endpoints to provide access to the external devices and services. The data stored in cloud manager may also include log bundles collected from edges. In some examples, the data in the cloud manager may be stored in the RDS 582. For example, entities in the IoT system 500 may be represented by object models, and the object models for the entities are stored in the RDS 582. In some examples, some data, e.g., log bundles collected from edges are stored in the storage service 584, e.g., Amazon's simple storage service (S3). The storage service 584 may allow any suitable data to be stored and accessed via web interfaces, which allows scalability. In some examples, the cloud manager service 590 may have multiple instances to allow scalability, where an edge system may be connected to one of the instances, e.g., via Web-Socket.

In some examples, the account service 591 may be configured to store account related APIs in a similar manner as the cloud manager service 590. For example, the data in the account service 591 may also be stored in the RDS 582 as object models. In some examples, the event service 592 may be configured to store data, e.g., event logging, application status, performance metrics and alerts. In a non-limiting example, data in the event service 592 may be stored and retrieved using any suitable database. Further, the event service 592 may use the search engine 586 to store and manage data. For example, the search engine may be implemented in Amazon's Elastic Search service. In a non-limiting example, the search engine 586 may store all logs from various the services 590-596 in the IoT manager 542. The search engine 586 may also be queried by other edge systems and users of the edge system(s) and user(s) 506(1)-(3), e.g., via web interfaces. In some examples, the operator service 596 may be configured to store software update packages and provide edge software upgrade. As similar to cloud manager service 590, the operator service 596 use storage service 584 (e.g., Amazon's S3) to store software update packages. The operator service 596 may also be configured to expose external endpoints to allow access by external devices and services.

In some examples, the IoT manager 542 may include other services, such as secure service 594, in-memory data service 593, and/or tunnel service 595. The secure service 594 may be configured to provide certificate management, such as SSL (secure socket layer) certificate management. In some examples, the secure service 594 may also use the RDS 582 to store tenant root certificate keys. In a non-limiting example, the secure service 594 may be implemented using CloudFlare SSL (CFSSL). The in-memory data service 593 may be configured to provide a key-value database to store suitable abstract data structure, such as text, bitmap, streams and indexes. The data service 593 may be a cache layer to store communication link (e.g., Web-Socket) states and distributed caching. In a non-limiting example, the in-memory data service 593 may be implemented in various platforms, such as open source REDIS. The tunnel service 595 may be configured to provide tunnel that may connect servers behind a firewall to clients on the Internet, and this can be used to provide tunneling to an edge device. In some examples, the tunnel may be a HTTPS tunnel. The tunnel service 595 may be implemented in WStunnel available under Apache.

In some examples, the above described services 590-596 in the IoT manager 542, may include a containerized system service implemented by a containerized system 504 (e.g., Kubernetes) deployment. The containerized system 504 may also be configured to provide DNS service lookup, easy scale, incremental rollout, pod monitoring and auto restart, etc. One or more services 590-596 may communicate each other via a remote procedure call (e.g., RPC, gRPC).

With further reference to FIG. 5, the IoT system 500 may also be configured to be scalable by using tenant-based sharding across multiple clusters, when the containerized system has a limit. In some examples, data services may be scaled up by using the RDS, ElasticSearch and/or S3 data services (from Amazon Web Services). In some examples, the S3 service may be used on demand, thus the load is not high. The IoT system 500 may use sharding on RDS or Elastic Search services. For example, the indices for Elastic Search may be sharded. Similarly, for RDS, the RDS instances may be scaled up by using tenant-based sharding.

In some examples, the IoT system 500 may be configured to run multiple containerized system clusters (e.g., Kubernetes). For example, the IoT system 500 may include a developer cluster and a production cluster. The clusters may include multiple node cluster (e.g., 5 nodes) setup and use the containerized system's namespace to facilitate sharing of the cluster among developers. For example, the IoT system 500 may assign developers direct access through the APIs (e.g., kubectl access for Kubernetes). The IoT system 500 may provide each developer a respective namespace. The IoT system 500 may also provide each developer an instance of RDS DB and a DNS entry. The system may also provide each developer a UI universal resource locator (URL) (e.g., https://<dev name>.containerizedsystem.com). In some examples, the system may also include shared namespaces for testing. For example, the test namespace may run multiple cloud manager instances (e.g., 590). The test name space may also run multiple account service instances (e.g., 591).

In some examples, the IoT system 500 may have multiple RDS instances (e.g., 582). For example, the system may have one Writer instance and multiple Reader instances. The system may configure the Write instance to receive database queries, whereas the Reader instances may be configured to receive read calls. This reduces the load on the database Writer. In some examples, there may be a delay between the time Writer instance performs a writing operation and the time the Reader instance notes the latest write change. When the delay is significant, the Reader instance may read incorrect data.

In some examples, the IoT system 500 may include a short lived key for write operations, where the short lived key has an expiration duration, e.g., 1 second, 2 seconds, 5 seconds etc. For example, when a write operation is activated, the system may set a short lived key for the expiration duration of time. After the expiration duration of time has passed, the system may automatically unset the short lived key. In a read operation, the system may check whether the short lived key is set or unset before invoking a database Reader to respond to a read query. If the short lived key is unset, the system may invoke the database Reader. If the short lived key is set, the system may wait before invoking the database Reader. The short lived key may be identified by <tenant id>/<entity type>. For example, a Read operation for a tenant/entity type may determine the absence of <tenant id>/<entity type> key (when such absence indicates no recent writes for the tenant/entity) before using DB reader to serve the query.

Alternatively, and/or additionally, the IoT system 500 may determine whether database inconsistency exists. For example, the system may determine that the delay between write and read of the latest write becomes significant. If the system determines that the database inconsistency exists, the system may decide not to create multiple Reader instances.

In some examples, one or more services or systems disclosed in the present disclosure (e.g., 590-596) may be configured to store user login failure count, e.g., in a REDIS key. For example, in each failed login for email, an email service may increment the error count. When the error count has exceed a threshold (e.g., 5), the email service may block user login. Additionally, and/or alternatively, the email service may also limit the number of login attempts to a threshold count per unit time period, e.g., 5 times per minute. In such a way, the email service may effectively make brute force attack to guess user login password more difficult.

In some examples, the IoT system 500 may implement a role-based access control (RBAC) to provide protections for the system to be scalable to manage larger organizations. In some examples, full-fledged RBAC with fine grained user roles and permissions may be implemented. In other examples, the system may implement project-based RBAC, in which the system may facilitate all users to gain access to data entities in a project and infra entities associated with a project via project assignment. For example, the IoT system 500 may assign a user zero or more projects. The system may also create data entities, such as applications, data pipelines, functions, etc. within a project in response to a user request, where the user must also have access to the project. Entities, such as edge devices, cloud profiles, container registry profiles, etc., that are associated with the applications, data pipelines, functions etc., may also be associated with zero or more projects via project creation, update, or deletion. The system may further classify users into admin users and non-admin users, in which only admin users have write access to projects.

In implementing project-based RBAC, the object model disclosed in the present disclosure for each tenant may be updated with projects. In some examples, data entities will each have a project_id attribute indicating which project it belongs to. Infra entities associated with data entities may include an entity-project association table to capture the many-to-many relationship between the entities and projects. In some examples, for each entity type, its CRUD API behavior may be specified under RBAC. For example, for an application entity, CUD API is allowed if and only if the user is assigned to the project associated with the entity. A Read API for an application entity will return all applications in all projects the user is assigned to. In another example, for a cloud profile entity, CUD API is allowed if and only if the user is an admin user. A call to a Read API for cloud profile from a non-admin user will return all cloud profiles associated with all projects the user is assigned to. A call to a Read API for cloud profile from an admin user, on the other hand, will return all cloud profiles regardless of project association. This is because admin users need to manage all cloud profiles. Although the examples only show application entity and cloud profile entity, other entity type, operation type, user type, user project membership, or combinations thereof may also be implemented.

Figure 6:
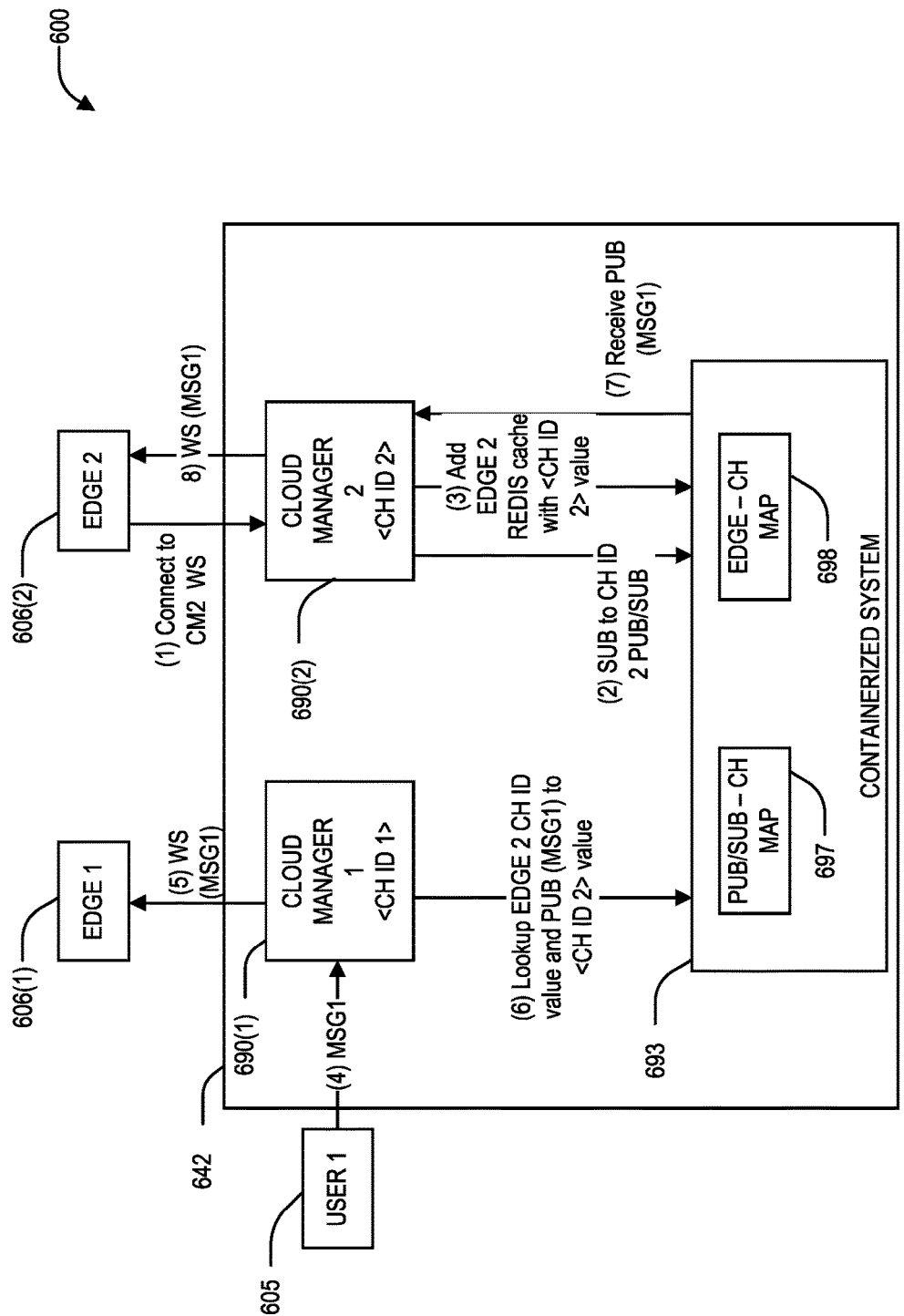
FIG. 6 is a block diagram illustrating communication via a centralized IOT manager of an IoT system, in accordance with an embodiment of the present disclosure.

The various embodiments disclosed in the present disclosure may allow various communications in the IoT system. FIG. 6 is a block diagram illustrating communication via a centralized IOT manager 642 of an IoT system 600, in accordance with an embodiment of the present disclosure. The IoT manager 642 may serve all edge systems (e.g., any of the one or more of the edge cluster(s) 110, the edge device(s) 112, and/or the edge VM(s) 115 hosted on the server/cluster 114 of FIG. 1, any edge system of any of the tenants 302(1)-(N) of FIG. 3, any of the edge system(s) of the edge system(s) and user(s) 506(1)-(3) of FIG. 5, or combinations thereof) and users (e.g., any of the user(s) of the edge system(s) and user(s) 506(1)-(3) of FIG. 5) across all tenants of the IoT system 600. The IoT manager 642 may be implemented in the centralized IoT manager 142 of FIG. 1, the centralized IoT manager formed by the IoT manager instances 224(1)-(N) of FIG. 2, the centralized IoT manager 342 of FIG. 3, IoT manager 542 of FIG. 5, or any combination thereof. Various configurations of the IoT manager 642 are included to meet scalability requirements. For example, the IoT manager 642 may support hundreds or thousands of customers, with over 100 edge systems each. Each edge system may make up to dozens of requests per minute. In some examples, the IoT manager 642 may have first and second cloud manager instances 690(1))-(2) each connected to an edge system, 606(1)-606(2), respectively. Although FIG. 6 shows two instances of cloud manager services, other number of instances may be possible. While FIG. 6 depicts the two cloud manager instances 690(1)-(2) each connected to a single one of the edge systems 606(1)-(2), each of the cloud manager instances 690(1)-(2) may be connected to more than one respective edge system. The cloud manager instances 690(1)-(2) may be in communication with the containerized system 693. The containerized system 693 may be implemented in a REDIS (e.g., by Amazon). At least one of the cloud manager instances 690(1)-(2) may be accessible by a user 605, e.g., to receive and send a message from/to the user.

In some examples, the IoT manager 642 may be scalable by externalizing states of services (e.g., 590-596 in FIG. 5) into data services so that these services may become stateless. For example, the IoT manager 642 may externalize the WebSocket connection states among the edge systems 606(1)-(2) and the cloud manager instances 690(1)-(2). In some examples, the containerized system 693 may include an edge-to-channel mapping 698. The edge-to-channel mapping 698 may be configured to cache the edge to cloud manager relationships. For example, the first edge system 606(1) is connected to the first cloud manager instance 690(1) using a first communication channel "ID 1", and the second edge system 606(2) may be connected to the second cloud manager instance 690(2) using a second communication channel "ID 2." The containerized system 693 is further configured to allow any of the cloud manager instances 690(1)-(2) to look up the edge-to-channel mapping 698. For example, one of the cloud manager instances 690(1)-(2) may query the containerized system 693 for a channel number given the edge system ID.

In some examples, the containerized system 693 may further include a publish/subscribe-to-channel mapping 697. The publish/subscribe-to-channel mapping 697 may be configured to cache one or more communication channels that have subscribed to the publishing of messages related to the edge system(s) 606(1)-(2) on each respective communication channel. An instance of the cloud manager instances 690(1)-(2) on a communication channel may be configured to receive a publish message sent by another instances of the cloud manager instances 690(1)-(2). A publish message may include information about entities (e.g., edge systems 606(1)-(2)) and change of entities. Upon receiving a message in a communication channel, an instance of the cloud manager instances 690(1)-(2) in the communication channel may operate upon one or more edge systems indicated in the publish message.

With further reference to FIG. 6, an example operation of the containerized system 693 and messaging between the edge systems 606(1)-(2) and the cloud manager instances 690(1)-(2) is illustrated. In some examples, a first edge system 606(1) is connected to the first cloud manager instance 609(1) in a first communication channel CH ID 1. A second edge system 606(2) is connected to the second cloud manager instance 690(2) in a second communication channel CH ID 2 at operation (1). The second cloud manager instance 690(2) may subscribe to messages on the second communication channel CH ID 2 at operation (2). The containerized system 693 may cache the second edge system 606(2) to second communication channel CH ID 2 relationship in the edge-to-channel mapping 698. For example, the second cloud manager instance 690(2) may add the second edge system 606(2) in association with the second communication channel CH ID 2 in the edge-to-channel mapping 698 at operation (3). An edge system may be identified by an edge device ID.

In some examples, the containerized system 693 may further store information about channel(s) subscribed in the publish/subscribe-to-channel mapping 697. For example, upon the second cloud manager instance 609(2) having subscribed to channel CH ID 2, the publish/subscribe-to-channel mapping 697 may store the subscribed channel number CH ID 2. The containerized system 693 may further be configured to receive a request from any of the cloud manager instances 690(1)-(2) to publish a message on a given communication channel, and in response, relay the message on the provided communication channel.

With further reference to FIG. 6, the user 605 may send a message to the first cloud manager instance 690(1) at operation (4). The message may be sent to the cloud manager instance 690(1) via an IoT manager API call, e.g., a REST API call. In some examples, the message may include a write operation, which may invoke other operations on one or more of the edge systems 606(1)-(2). For example, a user command in the user message may include deploying a data pipeline to one or more of the edge systems 606(1)-(2). In this example, the edge system 606(1) is directly connected to the first cloud manager instance 690(1) receiving the message from the user 605, while the edge system 606(2) is connected to the second cloud manager instance 690(2). In the instant example, the write operation may deploy data pipelines to both the first edge system 606(1) and the second edge system (606(2)), which are connected to the first and second cloud manager instances 690(1)-(2), respectively.

With continued reference to FIG. 6, upon receiving the message from the user 605, the first cloud manager instance 609(1) may send a data pipeline update message to the first edge system 606(1) at operation (5), e.g., via a WebSocket message, because the first edge system 606(1) is directly connected to the first cloud manager instance 609(1). The payload of the message may be the REST message sent by the user at operation (4). For example, the message may contain parameters associated with the data pipeline change.

In response to receiving the message, the first edge system 606(1) may implement the data pipeline change specified in the message.

With further reference to FIG. 6, in response to receiving the user message at operation (4), the first cloud manager instance 609(1) may further determine the communication channel associated with the second edge system 606(2) at operation (6). For example, the first cloud manager instance 609(1) may look up the edge to channel mapping 698 in the containerized system 693 by the device ID of the second edge system 606(2). In the instant example, the determined communication channel is CH ID 2.

Upon determining the communication channel(s) associated with the edge system 606(2) related to the message from the user 605, the first cloud manager instance 690(1) may further publish the message on the second communication channel CH ID 2 at operation (6). In response to the publishing of the message at the second communication channel, the second cloud manager instance 609(2) receives the message at operation (7) and subsequently send the message to the second edge system 606(2) on the second communication channel at operation (8). The message sent to the second edge system 606(2) may contain parameters associated with data pipeline change regarding the second edge system 606(2). In response to receiving the message, the second edge system 606(2) may perform the operations as specified in the message. When the containerized system 693 is implemented in REDIS, the cloud manager instances 690(1)-(2) may publish the messages in a REDIS message.

The above configuration of the IoT system 600 may allow scalability of the system. For example, the limit of the containerized system 693 may be the size of the memory. As such, the containerized system 693 may readily support 100 subscribers and 100, 000 messages, and handle messages by over 10, 000 customers. Although operations in the above example are illustrated in numerals, it is appreciated that the order of the operations may vary. Further, a subset of the illustrated operations may also be independently performed without requiring all of the operations to be performed.

Figure 7:
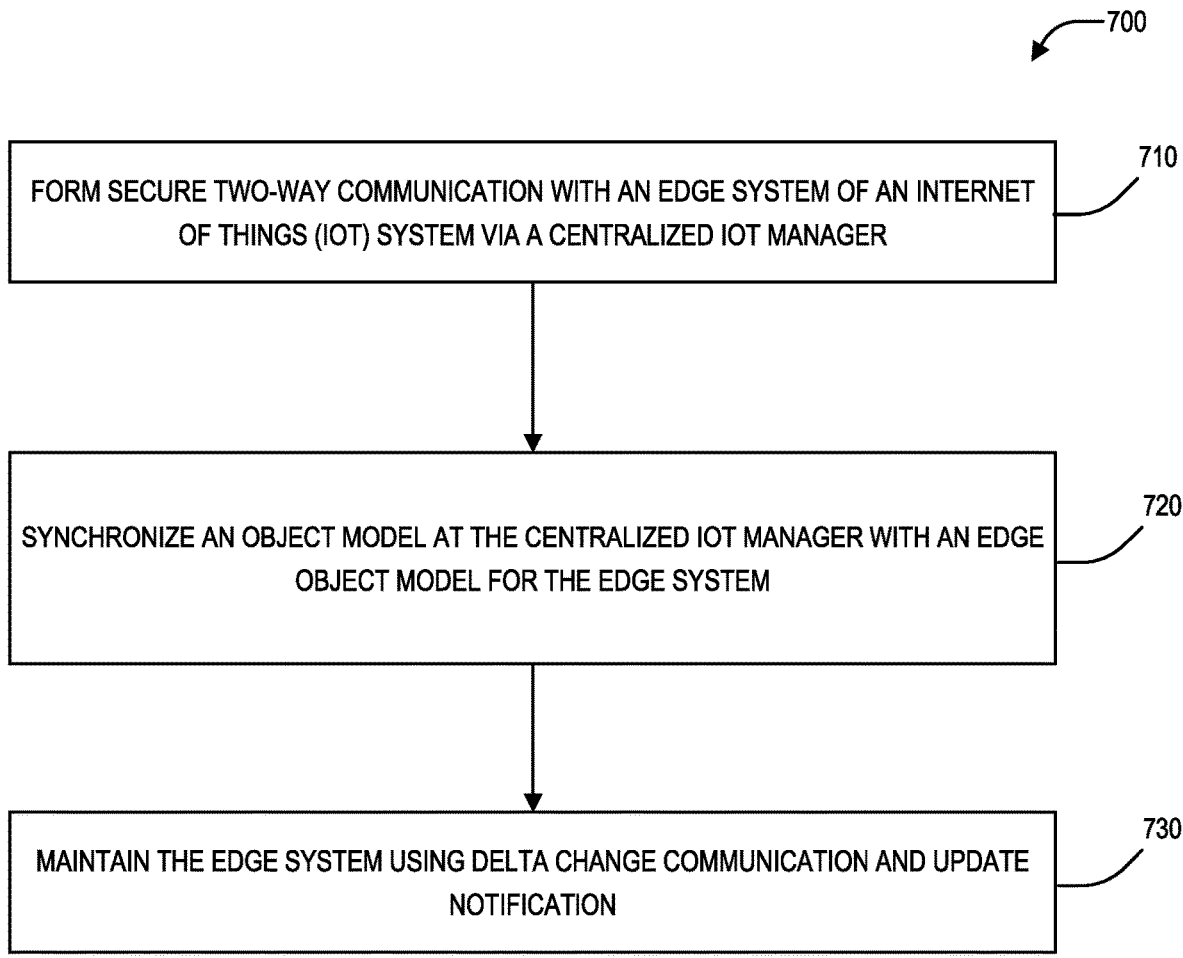
FIG. 7 is a flow diagram of a method to communicate with an edge system of an IoT system, in accordance with an embodiment of the present disclosure.

FIG. 7 is a flow diagram of a method 700 to communicate with an edge system of an IoT system, in accordance with an embodiment of the present disclosure. The method 700 may be implemented in an IoT system, such as the IoT system 100 of FIG. 1, the IoT system 200 of FIG. 2, the IoT system 300 of FIG. 3, the IoT system of 500 of FIG. 5), the IoT system 600 of FIG. 6, of a combination thereof. The method 700 may include forming a secure two-way communication with an edge system of an IoT system via a centralized IoT manager hosted on a computing system at operation 710. The centralized IoT manager may be formed by the IoT manager instances 224(1)-(N) of FIG. 2, the centralized IoT manager 342 of FIG. 3, or any combination thereof. The edge system may include any of the edge systems shown in FIGS. 1, 3, 5 and 6. In some examples, the centralized IoT manager may support two-way communication using secure protocols, such as HTTPS, WSS protocol, etc. A metadata object model may be provided to fully specify behavior of edge systems.

In some examples, the method 700 may further synchronize an object model at the centralized IoT manager with an edge object model for the edge system at operation 720. This is referred to as initial synchronization. In some examples, the object model of the edge system may persist at the edge system to allow the edge system to continue to operate offline. The method 700 may further maintain the edge system using a delta change communication and notification at operation 730. For example, the IoT manager may manage subsequent object model synchronizations after the initial synchronization using delta-based communication and update notification (e.g., WebSocket), which is more efficient than full object model synchronizations. For example, the IoT manager may monitor the changes of the object model of the IoT system and/or the changes of the object model for the edge system, and synchronize the object model of the system and the object model of the edge system only with respect to the changes of each respective object model. The method 700 may be implemented in any suitable manner. For example, the method 700 may implement the process 400, 430 (in FIGS. 4A and 4B) or a subset of the processes 400 and 430.

Figure 8:
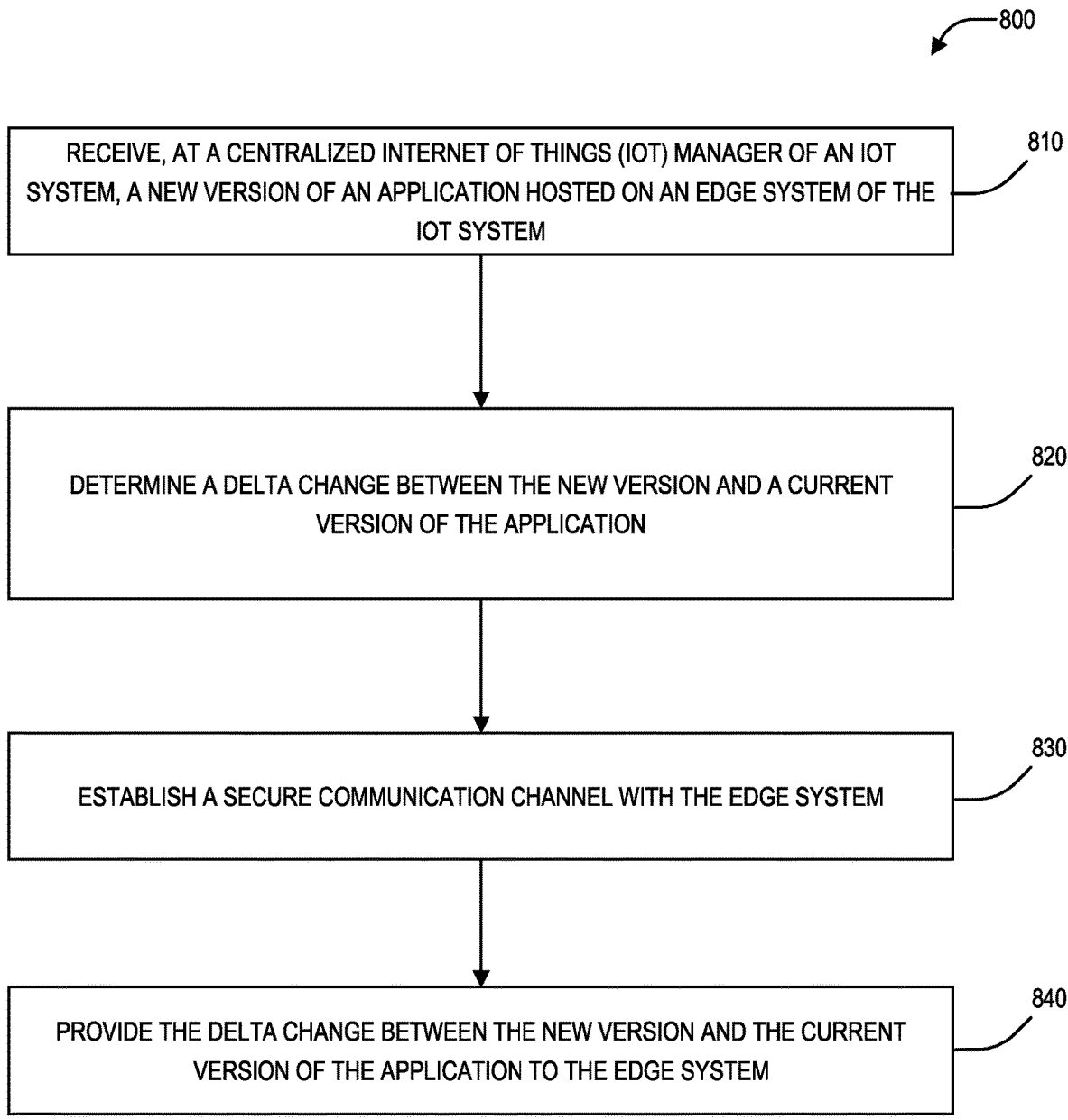
FIG. 8 is a flow diagram of a method to provide a software update to an edge system of an IoT system, in accordance with an embodiment of the present disclosure.

FIG. 8 is a flow diagram of a method 800 to provide software update to an edge system of an IoT system, in accordance with an embodiment of the present disclosure. The method 800 may be implemented in an IoT system, such as the IoT system 100 of FIG. 1, the IoT system 200 of FIG. 2, the IoT system 300 of FIG. 3, the IoT system of 500 of FIG. 5), the IoT system 600 of FIG. 6, of a combination thereof. The method 800 may include receiving, at a centralized IoT manager of an IoT system, a new version of an application hosted on an edge system of the IoT system at operation 810. In some examples, the centralized IoT manager of the IoT system may be configured to centrally manage edge systems of the IoT system, including pushing software and/or configuration updates to the edge systems, providing data pipelines and other applications to the edge systems, storing/updating respective metadata for the IoT system in a database, etc. The centralized IoT manager may be formed by the IoT manager instances 224(1)-(N) of FIG. 2, the centralized IoT manager 342 of FIG. 3, or any combination thereof. The edge system may include any of the edge systems shown in FIGS. 1, 3, 5 and 6.

The method 800 may further determine a delta change between the new version and the current version of the application at operation 820. In some examples, the method 800 may compare the object model of the system with the object model of the edge system that hosts the application.

With further reference to FIG. 8, the method 800 may further establish a secure communication channel with the edge system at operation 830. Various communication protocols may be possible. For example, the method 800 may establish the communication channel using a WebSocket communication protocol. Upon establishing the communication channel between the IoT manager and the edge system, the method 800 may provide the delta change between the new version and the current version of the application to the edge system at operation 840. In some examples, the centralized IoT manager may manage the software updates of the edge systems by pushing the software updates according to a determined schedule managed by the centralized IoT manager. In other words, one or more of operations 810, 820, 830 and 840 may be configured to perform at the determined schedule. For example, the method 800 may periodically check for software update and receive the new version of the software at operation 810. In some examples, the method 800 may be implemented in any suitable manner. For example, the method 800 may implement the process 400, 430 (in FIGS. 4A and 4B) or a subset of the processes 400 and 430.

Figure 9:
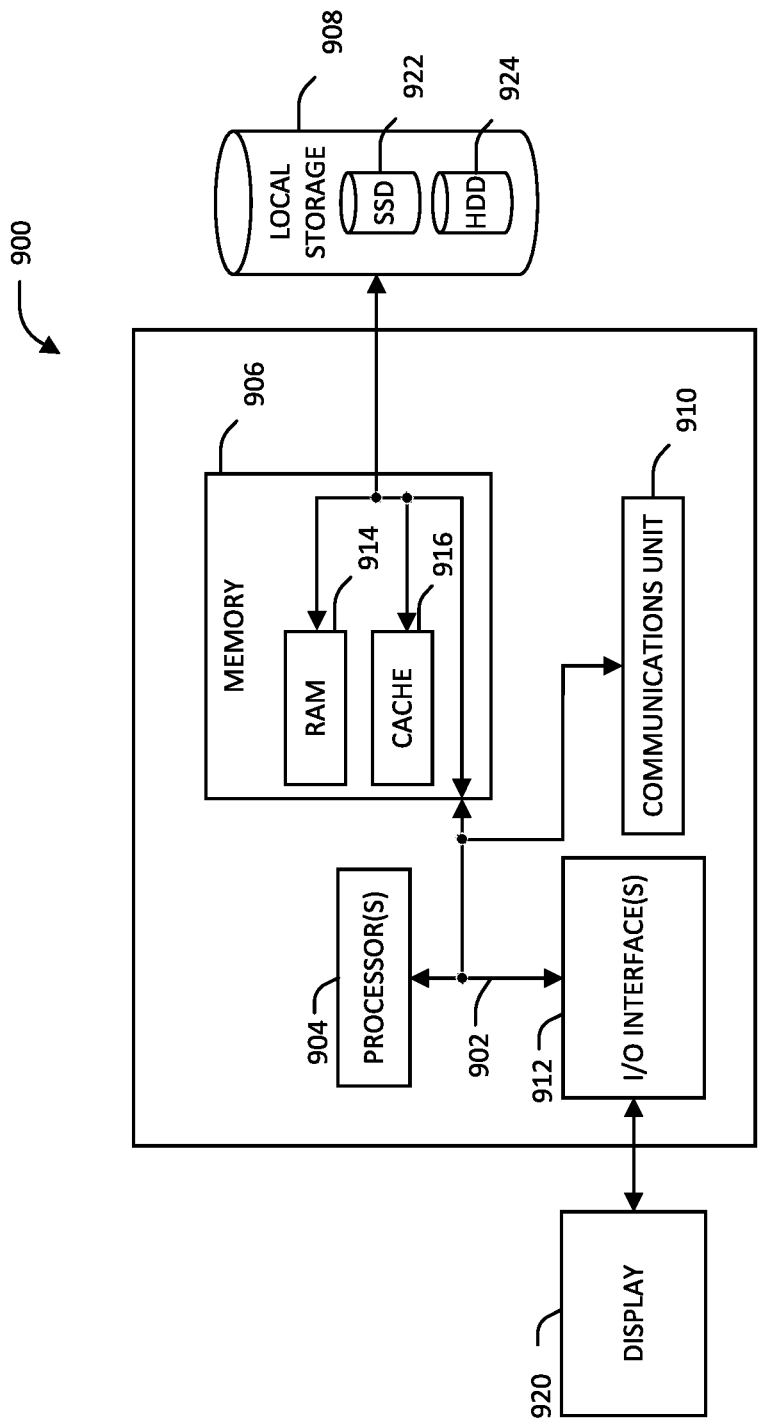
FIG. 9 is a block diagram of components of an edge system or computing in accordance with an embodiment of the present disclosure.

FIG. 9 depicts a block diagram of components of an edge system and/or a computing node (device) 900 in accordance with an embodiment of the present disclosure. It should be appreciated that FIG. 9 provides only an illustration of one implementation and does not imply any limitations with regard to the environments in which different embodiments may be implemented. Many modifications to the depicted environment may be made. The device 900 may implemented as any of an edge system of the edge cluster(s) 110, the edge device(s) 112, the server/cluster 114, a computing node of the central IoT computing system 140, or a computing node of the data computing system 150 of FIG. 1, all or part of the edge computing system 200 of FIG. 2, any of the computing nodes 204(1)-(N) of FIG. 2, any of the edge systems of the tenants 302(1)-(N) and/or a computing node configured to host the centralized IoT manager 342 of FIG. 3, any of the edge systems of the edge(s) and user(s) 506(1)-(3) and/or any device configured to host the centralized IoT manager 542 of FIG. 5, either of the edge systems 606(1)-(2) and/or devices configured host the centralized IoT manager 642 of FIG. 6, or any combination thereof. The device 900 may be configured to implement the method 700 of FIG. 7, and method 800 of FIG. 8, or any combination thereof.

The device 900 includes a communications fabric 902, which provides communications between one or more processor(s) 904, memory 906, local storage 908, communications unit 910, I/O interface(s) 912. The communications fabric 902 can be implemented with any architecture designed for passing data and/or control information between processors (such as microprocessors, communications and network processors, etc.), system memory, peripheral devices, and any other hardware components within a system. For example, the communications fabric 902 can be implemented with one or more buses.

The memory 906 and the local storage 908 are computer-readable storage media. In this embodiment, the memory 906 includes random access memory RAM 914 and cache 916. In general, the memory 906 can include any suitable volatile or non-volatile computer-readable storage media. The local storage 908 may be implemented as described above with respect to local storage 206(1)-(N) and/or storage 270 of FIG. 2. In this embodiment, the local storage 908 includes an SSD 922 and an HDD 924, which may be implemented as described above with respect to any of SSD 240(1)-(N) and any of HDD 242(1)-(N), respectively.

Various computer instructions, programs, files, images, etc. may be stored in local storage 908 for execution by one or more of the respective processor(s) 904 via one or more memories of memory 906. In some examples, local storage 908 includes a magnetic HDD 924. Alternatively, or in addition to a magnetic hard disk drive, local storage 908 can include the SSD 922, a semiconductor storage device, a read-only memory (ROM), an erasable programmable read-only memory (EPROM), a flash memory, or any other computer-readable storage media that is capable of storing program instructions or digital information.

The media used by local storage 908 may also be removable. For example, a removable hard drive may be used for local storage 908. Other examples include optical and magnetic disks, thumb drives, and smart cards that are inserted into a drive for transfer onto another computer-readable storage medium that is also part of local storage 908.

Communications unit 910, in these examples, provides for communications with other data processing systems or devices. In these examples, communications unit 910 includes one or more network interface cards. Communications unit 910 may provide communications through the use of either or both physical and wireless communications links.

I/O interface(s) 912 allows for input and output of data with other devices that may be connected to device 900. For example, I/O interface(s) 912 may provide a connection to external device(s) 918 such as a keyboard, a keypad, a touch screen, and/or some other suitable input device. External device(s) 918 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 908 via I/O interface(s) 912. I/O interface(s) 912 also connect to a display 920. Display 920 provides a mechanism to display data to a user and may be, for example, a computer monitor.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. At least one non-transitory computer-readable storage medium including instructions that, when executed, cause a system to:
form a two-way communication between a central computing system comprising a centralized manager and an edge system, the edge system comprising a virtual machine, the central computing system having an object model and the edge system having an edge object model corresponding to data associated with the edge system;
synchronize, by the centralized manager, the object model with the edge object model for the edge system; and
maintain the edge system using a delta change communication including a change between a new version and a current version of an application at the edge system to update the edge object model in response to an update of the object model after synchronization.

2. The at least one non-transitory computer-readable storage medium of claim 1, wherein the instructions further cause the system to:
in response to a detection of a change of the application on the edge system based on an operation of the edge system, transmit a respective message to a second edge system that includes information about the change of application of the edge system.

3. The at least one non-transitory computer-readable storage medium of claim 2, wherein the edge system and the second edge system are part of a platform, and wherein the instructions further cause the system to:
in response to a request for inventory from the edge system, provide the inventory of the platform to the edge system.

4. The at least one non-transitory computer-readable storage medium of claim 2, wherein the edge system resides within a tenant that includes the second edge system.

5. The at least one non-transitory computer-readable storage medium of claim 2, wherein the operation of the edge system is a write operation.

6. The at least one non-transitory computer-readable storage medium of claim 2, wherein edge system is part of an Internet of Things (IoT) system.

7. The at least one non-transitory computer-readable storage medium of claim 6, wherein the IoT system comprises an IoT manager in communication with the edge system.

8. The at least one non-transitory computer-readable storage medium of claim 1, wherein the two-way communication comprises a Web Socket.

9. The at least one non-transitory computer-readable storage medium of claim 1, wherein said form the two-way communication comprises access a map including an association between the centralized manager and the edge system, the map further including a second association between the centralized manager and a second edge system.

10. The at least one non-transitory computer-readable storage medium of claim 9, wherein the association between the centralized manager and the edge system comprises a channel number for the two-way communication.

11. The at least one non-transitory computer-readable storage medium of claim 1, wherein the system is configured to implement project-based role-based access control, and wherein said object model includes at least one project for the project-based role-based access control.

12. A system comprising:
a central computing system hosting a centralized manager; and
an edge system, wherein the centralized manager is configured to:
form a two-way communication between the central computing system and the edge system, the edge system comprising a virtual machine, the central computing system having an object model and the edge system having an edge object model corresponding to data associated with the edge system;
synchronize the object model with the edge object model for the edge system; and
maintain the edge system using a delta change communication including a change between a new version and a current version of an application at the edge system to update the edge object model in response to an update of the object model after synchronization.

13. The system of claim 12, wherein the centralized manager is further configured to:
detect a change of the application on the edge system based at least on an operation of the edge system; and
transmit a respective message to a second edge system that includes information about the change of application of the edge system.

14. The system of claim 13, wherein the edge system and the second edge system are part of a platform, and wherein the centralized manager is further configured to provide inventory of the platform to the edge system.

15. The system of claim 13, wherein the edge system resides within a tenant that includes the second edge system.

16. The system of claim 13, wherein the operation of the edge system is a write operation.

17. The system of claim 13, wherein the edge system, the second edge system, or a combination thereof, is part of an Internet of Things (IoT) system.

18. The system of claim 17, wherein the IoT system comprises an IoT manager in communication with the edge system, wherein the centralized manager is the IoT manager.

19. The system of claim 12, wherein the two-way communication comprises a Web Socket.

20. The system of claim 12, wherein said form the two-way communication comprises access a map including an association between the centralized manager and the edge system, the map further including a second association between the centralized manager and a second edge system.

21. The system of claim 20, wherein the association between the centralized manager and the edge system comprises a channel number for the two-way communication.

22. The system of claim 12, wherein the central computing system is configured to implement project-based role-based access control, and wherein said object model includes at least one project for the project-based role-based access control.

23. A method comprising:
forming, by a centralized manager of a central computing system, and using a two-way communication protocol, a two-way communication between the central computing system and an edge system, the edge system comprising a virtual machine, the central computing system having an object model and the edge system having an edge object model corresponding to data associated with the edge system;
synchronizing, by the centralized manager, the object model with the edge object model for the edge system; and
maintaining, by the centralized manager, the edge system using delta change communication including a change between a new version and a current version of an application at the edge system to update the edge object model in response to an update of the object model after synchronization.

24. The method of claim 23, the method further comprising:
detecting, by the centralized manager, a change of the application on the edge system based at least on an operation of the edge system; and
transmitting, by the centralized manager, a respective message to a second edge system that includes information about the change of application of the edge system.

25. The method of claim 24, wherein the operation of the edge system is a write operation.

26. The method of claim 24, wherein the edge system, the second edge system, or a combination thereof, is part of an Internet of Things (IoT) system.

27. The method of claim 26, wherein the IoT system comprises an IoT manager in communication with the edge system, wherein the centralized manager is the IoT manager.

28. The method of claim 23, the method further comprising:
providing inventory of a platform to the edge system, wherein the edge system and the second edge system are part of the platform, and wherein the edge system resides within a tenant that includes the second edge system.

29. The method of claim 23, wherein the two-way communication comprises a Web Socket.

30. The method of claim 23, wherein said forming the two-way communication comprises access a map including an association between the centralized manager and the edge system, the map further including a second association between the centralized manager and a second edge system.

31. The method of claim 30, wherein the association between the centralized manager and the edge system comprises a channel number for the two-way communication.

32. The method of claim 23, further comprising using project-based role-based access control, and wherein said object model includes at least one project for the project-based role-based access control.

\* \* \* \* \*